(12) United States Patent
Katsumata et al.

(10) Patent No.: US 10,656,900 B2
(45) Date of Patent: May 19, 2020

(54) INFORMATION PROCESSING DEVICE, INFORMATION PROCESSING METHOD, AND PROGRAM

(71) Applicant: SONY CORPORATION, Tokyo (JP)

(72) Inventors: Mitsuru Katsumata, Tokyo (JP); Toru Chinen, Kanagawa (JP); Masayoshi Mizuno, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/741,848

(22) PCT Filed: Jul. 19, 2016

(86) PCT No.: PCT/JP2016/071111
§ 371 (c)(1),
(2) Date: Jan. 4, 2018

(87) PCT Pub. No.: WO2017/022467
PCT Pub. Date: Feb. 9, 2017

(65) Prior Publication Data
US 2018/0196635 A1    Jul. 12, 2018

(30) Foreign Application Priority Data

Aug. 6, 2015  (JP) ................. 2015-155740

(51) Int. Cl.
*G06F 3/16* (2006.01)
*H04S 7/00* (2006.01)
(Continued)

(52) U.S. Cl.
CPC .......... *G06F 3/165* (2013.01); *H04N 21/439* (2013.01); *H04S 3/008* (2013.01); *H04S 7/30* (2013.01);
(Continued)

(58) Field of Classification Search
CPC ........ G06F 3/165; H04N 21/439; H04N 5/91; H04N 21/440218; H04N 21/8106; H04S 5/02; H04S 7/303; G09B 21/006
See application file for complete search history.

(56) References Cited

U.S. PATENT DOCUMENTS 6,829,017 B2 * 12/2004 Phillips .................... H04S 3/00
                                                  348/578
7,536,705 B1 * 5/2009 Boucher ............. H04L 12/1836
                                                  725/112
(Continued)

FOREIGN PATENT DOCUMENTS

CN    102197646 B  * 11/2013  ........... G06K 9/0057
JP    09-093700 A     4/1997
(Continued)

OTHER PUBLICATIONS

Roden et al, designing a narrative based audio only engine 3D game engine, ACE, 2005.*

*Primary Examiner* — Davetta W Goins
*Assistant Examiner* — Kuassi A Ganmavo
(74) *Attorney, Agent, or Firm* — Paratus Law Group, PLLC

(57) ABSTRACT

A device and method capable of performing image following type audio control or image non-following type audio control are implemented. Images in different directions are selectively displayed on the display unit, and an output audio is controlled in accordance with an image display. A data processing unit executes image following type audio control of moving an audio source direction in accordance with movement of the display image of the display unit and image non-following type audio control of not moving the audio source direction in accordance with the movement of an image in units of individual controllable audio elements. The data processing unit acquires audio control information from
(Continued)

an MP4 file or a media presentation description (MPD) file and executes either the image following type audio control or the image non-following type audio control in accordance with the acquired audio control information in units of individual controllable audio elements.

17 Claims, 26 Drawing Sheets

(51) Int. Cl.
    *H04S 3/00*     (2006.01)
    *H04N 21/439*     (2011.01)
    *G09B 21/00*     (2006.01)
    *H04N 5/91*     (2006.01)
    *H04N 21/81*     (2011.01)
    *H04S 5/02*     (2006.01)
    *H04N 21/4402*     (2011.01)

(52) U.S. Cl.
    CPC .............. *G09B 21/006* (2013.01); *H04N 5/91* (2013.01); *H04N 21/440218* (2013.01); *H04N 21/8106* (2013.01); *H04R 2499/11* (2013.01); *H04R 2499/15* (2013.01); *H04S 5/02* (2013.01)

(56) References Cited

U.S. PATENT DOCUMENTS

| | | | | |
|---|---|---|---|---|
| 2002/0024675 | A1* | 2/2002 | Foxlin | G02B 27/017 356/620 |
| 2003/0007648 | A1* | 1/2003 | Currell | H04S 7/30 381/61 |
| 2004/0056885 | A1* | 3/2004 | Azami | G06F 3/038 715/723 |
| 2006/0075422 | A1* | 4/2006 | Choi | G01S 3/7864 725/18 |
| 2007/0091359 | A1* | 4/2007 | Suzuki | H04N 21/835 358/1.15 |
| 2011/0311207 | A1* | 12/2011 | Urabe | H04N 21/234327 386/353 |
| 2013/0091251 | A1* | 4/2013 | Walker | H04N 21/6125 709/219 |
| 2013/0159546 | A1* | 6/2013 | Thang | H04L 65/4084 709/231 |
| 2014/0119514 | A1* | 5/2014 | Miyazawa | A61B 6/463 378/98 |
| 2014/0119581 | A1* | 5/2014 | Tsingos | H04S 3/008 381/300 |
| 2014/0233917 | A1* | 8/2014 | Xiang | G11B 27/031 386/285 |
| 2014/0314391 | A1* | 10/2014 | Kim | G11B 27/11 386/248 |
| 2014/0372957 | A1* | 12/2014 | Keane | G06F 3/013 715/852 |
| 2015/0025664 | A1* | 1/2015 | Cory | H04S 7/30 700/94 |
| 2015/0223002 | A1* | 8/2015 | Mehta | H04S 7/30 381/303 |
| 2016/0269712 | A1* | 9/2016 | Ostrover | H04S 7/302 |
| 2017/0028308 | A1* | 2/2017 | Bear | H04N 21/42224 |
| 2017/0153866 | A1* | 6/2017 | Grinberg | G02B 27/017 |
| 2017/0156015 | A1* | 6/2017 | Stockhammer | H04S 3/006 |
| 2018/0098150 | A1* | 4/2018 | Penke | G06F 3/162 |

FOREIGN PATENT DOCUMENTS

| | | | |
|---|---|---|---|
| JP | 2002-345097 A | | 11/2002 |
| JP | 2004007610 A | * | 1/2004 |
| JP | 2007-201818 A | | 8/2007 |
| JP | 2010074238 A | * | 4/2010 |
| JP | 2012-199786 A | | 10/2012 |
| JP | 2015-015553 A | | 1/2015 |
| WO | WO 2014/011720 A1 | | 1/2014 |

* cited by examiner

FIG. 7

```
aligned(8) class NoTrackingAudio extends FullBox('NTRK') {
  unsigned int(8) no_tracking_flags;          ← 91 ALL-AUDIO CORRESPONDENCE
                                                 CONTROL INFORMATION
                                                 (no_tracking_flag)
  if( no_tracking_flag & Some_Channel) {
    unsigned int(8) count;                    ← 94 count
                                                 = NUMBER OF CHANNELS
    for (i=1 ; i<=count; i++) {
      unsigned int(1) NoTracking;             ← 93 INDIVIDUAL AUDIO (i) CORRESPONDENCE
                                                 CONTROL INFORMATION
                                                 (NoTracking)
    }
    aligned(8);
  }
}
```

92 LOOP PROCESSING PORTION (CONTROL TARGET AUDIO IDENTIFIER i=1 TO count)

FIG. 8

| | (1) VALUE OF ALL-AUDIO CORRESPONDENCE CONTROL INFORMATION (no_tracking flags) | (2) AUDIO CONTROL FORM |
|---|---|---|
| (a) | 0 | CAUSE ALL AUDIOS TO FOLLOW DISPLAY IMAGE (All channels can be tracked) |
| (b) | 1 | CAUSE ALL AUDIOS NOT TO FOLLOW DISPLAY IMAGE (All channels are not tracked) |
| (c) | 2 | DISPLAY IMAGE FOLLOWING AUDIO AND DISPLAY IMAGE NON-FOLLOWING AUDIO ARE MIXED (Some channels can be tracked) |
| (d) | 4 | DISPLAY IMAGE FOLLOWING AUDIO AND DISPLAY IMAGE NON-FOLLOWING AUDIO ARE SETTABLE BY USER (User selected channels can be tracked) |

FIG. 9

| VALUE | NUMBER OF AUDIO ELEMENTS (NUMBER OF CHANNELS) | AUDIO ELEMENT INCLUDED MP4 FILE | RECORDING ORDER OF AUDIO ELEMENT CORRESPONDENCE CONTROL INFORMATION (MAPPING WITH SPEAKERS) |
|---|---|---|---|
| 1 | 1 | SINGLE CHANNEL ELEMENT [single_channel_element()] | FIRST AUDIO ELEMENT = CENTER FRONT SPEAKER (center front speaker) |
| 2 | 2 | CHANNEL PAIR ELEMENT [channel_pair_element()] | FIRST AUDIO ELEMENT = LEFT FRONT SPEAKER (left front speaker)<br>SECOND AUDIO ELEMENT = RIGHT FRONT SPEAKER (right front speaker) |
| ... | ... | ... | ... |
| 6 | 5.1 | SINGLE CHANNEL ELEMENT [single_channel_element()]<br>CHANNEL PAIR ELEMENT [channel_pair_element()]<br>CHANNEL PAIR ELEMENT [channel_pair_element()]<br>LOW FREQUENCY EFFECT ELEMENT [lfe_element()] | FIRST AUDIO ELEMENT = CENTER FRONT SPEAKER (center front speaker)<br>SECOND AUDIO ELEMENT = LEFT FRONT SPEAKER (left front speaker)<br>THIRD AUDIO ELEMENT = RIGHT FRONT SPEAKER (right front speaker)<br>FOURTH AUDIO ELEMENT = LEFT SURROUND SPEAKER (left surround speaker)<br>FIFTH AUDIO ELEMENT = RIGHT SURROUND SPEAKER (right surround speaker)<br>SIXTH AUDIO ELEMENT = LOW FREQUENCY ENHANCEMENT SPEAKER (low frequency enhancement speaker) |
| ... | ... | ... | ... | value of schemeUri = "urn:mpeg:dash:23003:3:audio_channel_configuration:2011"

NUMBER AND ORDER OF SPEAKERS

FIG. 10

| | (1) VALUE OF AUDIO ELEMENT (i) CORRESPONDENCE CONTROL INFORMATION (NoTracking) | (2) CONTROL FORM OF AUDIO ELEMENT (i) |
|---|---|---|
| (a) | 0 | CAUSE AUDIO (i) TO FOLLOW DISPLAY IMAGE (The channel can be tracked) |
| (b) | 1 | CAUSE AUDIO (i) NOT TO FOLLOW DISPLAY IMAGE (The channel is not tracked) |

FIG. 14

| | (1) VALUE OF AUDIO CONTROL INFORMATION OF STREAM UNIT | (2) AUDIO CONTROL INFORMATION OF CHANNEL UNIT INCLUDED IN ONE STREAM | (3) AUDIO CONTROL FORM |
|---|---|---|---|
| (a) | 0 | — | CAUSE ALL AUDIOS TO FOLLOW DISPLAY IMAGE (All channels can be tracked) |
| (b) | 1 | — | CAUSE ALL AUDIOS NOT TO FOLLOW DISPLAY IMAGE (All channels are not tracked) |
| (c) | 2 | 0 OR 1 IS SET FOR EACH ELEMENT | DISPLAY IMAGE FOLLOWING AUDIO AND DISPLAY IMAGE NON-FOLLOWING AUDIO ARE MIXED (Some channels can be tracked) CONTROL ACCORDING TO SETTING VALUE (0.1) SET FOR EACH ELEMENT |
| (d) | 4 | — | DISPLAY IMAGE FOLLOWING AUDIO AND DISPLAY IMAGE NON-FOLLOWING AUDIO ARE SETTABLE BY USER |

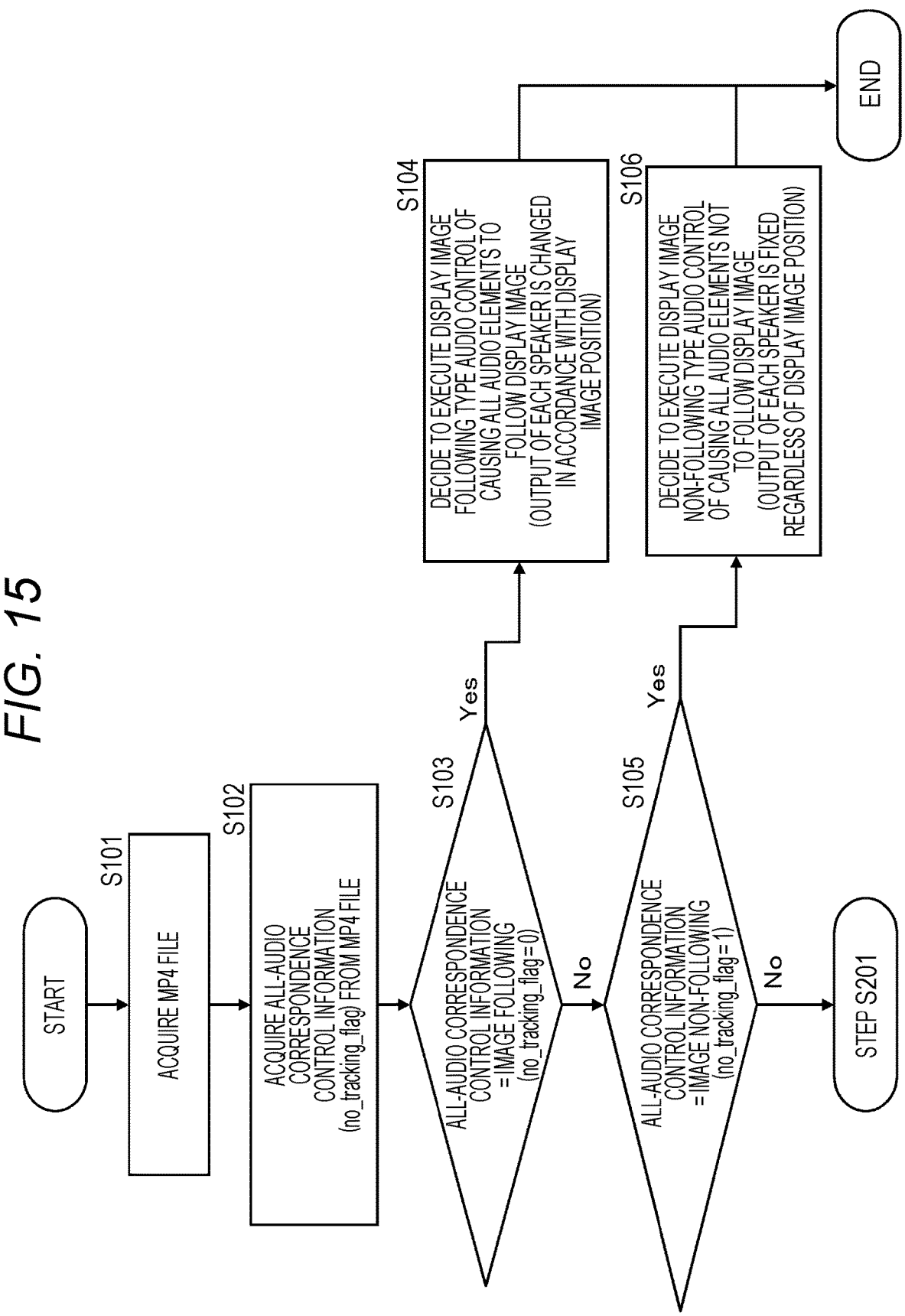

FIG. 20

| VALUE OF MPD `<Role schemeIdUri="http://foo.bar/scheme/AudioNoTracking" value="???">` | AUDIO CONTROL FORM | ALL-AUDIO CORRESPONDENCE CONTROL INFORMATION OF CORRESPONDING MP4 (no_tracking_flags) |
|---|---|---|
| NO SETTING (NOT Role) | — | 0 |
| NoTracking | CAUSE ALL AUDIOS NOT TO FOLLOW DISPLAY IMAGE (All channels are not tracked) | 1 |
| NUMERICAL VALUE CHARACTER STRING | DISPLAY IMAGE FOLLOWING AUDIO AND DISPLAY IMAGE NON-FOLLOWING AUDIO ARE MIXED (Some channels can be tracked) | 2 |
| USER | DISPLAY IMAGE FOLLOWING AUDIO AND DISPLAY IMAGE NON-FOLLOWING AUDIO ARE SETTABLE BY USER (User selected channels can be tracked) | 4 |

FIG. 21

```
<MPD>
<Period>
  <AdaptationSet mime-type="video/mp4">
    <Representation>
      <BaseURL> http://foo.bar/video.mp4</BaseURL>
    </Representation>
  </AdaptationSet>

<!-- Audio IN WHICH ONLY Center Channel OF 5.1ch IS NOT Tracked -->
  <AdaptationSet mime-type="audio/mp4">
    <AudioChannelConfiguration schemeUri="urn:mpeg:dash:23003:3:audio_channel_configuration:2011" value="6">
    <Role schemeIdUri="http://foo.bar/scheme/AudioNoTracking" value="100000">
    <Representation>
      <BaseURL> http://foo.bar/audio.mp4</BaseURL>
    </Representation>
  </AdaptationSet>

</Period>
</MPD>
```

251: CONTROL INFORMATION IN WHICH ONE AUDIO ELEMENT (Center Chanel) OF 5.1ch STREAM IS SET TO "DISPLAY IMAGE NON-FOLLOWING TYPE CONTROL"

SETTING VALUE (value) INDICATING VALUE: 1="DISPLAY IMAGE NON-FOLLOWING TYPE" AND VALUE: 0 "DISPLAY IMAGE FOLLOWING TYPE"

FIG. 22

```
<MPD>
<Period>
<AdaptationSet mime-type="video/mp4">
  <Representation>
    <BaseURL> http://foo.bar/video.mp4</BaseURL>
  </Representation>
</AdaptationSet>

<!-- Audio IN WHICH STREAM OF 1ch IS NOT Tracked-->
<AdaptationSet mime-type="audio/mp4">
  <AudioChannelConfiguration schemeUri="urn:mpeg:dash:23003:3:audio_channel_configuration:2011" value="1" >
  <Role schemeIdUri="http://foo.bar/scheme/AudioNoTracking" value="NoTracking">
  <Representation>
    <BaseURL> http://foo.bar/audio1.mp4</BaseURL>
  </Representation>
</AdaptationSet>

</Period>
</MPD>
```

252 — CONTROL INFORMATION IN WHICH ONE AUDIO ELEMENT OF 1ch STREAM IS SET TO "DISPLAY IMAGE NON-FOLLOWING TYPE CONTROL"

SETTING VALUE (value) INDICATING "DISPLAY IMAGE NON-FOLLOWING TYPE"

FIG. 23

```
<MPD>
 <Period>
  <AdaptationSet mime-type="video/mp4">
   <Representation>
    <BaseURL> http://foo.bar/video.mp4</BaseURL>
   </Representation>
  </AdaptationSet>                                    ⎫
                                                      ⎬ CONTROL OF 2ch STREAM IS SELECTABLE BY USER
  <!-- Audio IN WHICH ONLY Center Channel OF 2ch IS NOT Tracked -->
  <AdaptationSet mime-type="audio/mp4">
   <AudioChannelConfiguration schemeUri="urn:mpeg:dash:23003:3:audio_channel_configuration:2011" value="2">
   <Role schemeIdUri="http://foo.bar/scheme/AudioNoTracking" value="USER">   ─── 253
   <Representation>                                                          SETTING VALUE (value) INDICATING
    <BaseURL> http://foo.bar/audio.mp4</BaseURL>                             "SELECTABLE BY USER"
   </Representation>
  </AdaptationSet>
 </Period>
</MPD>
```

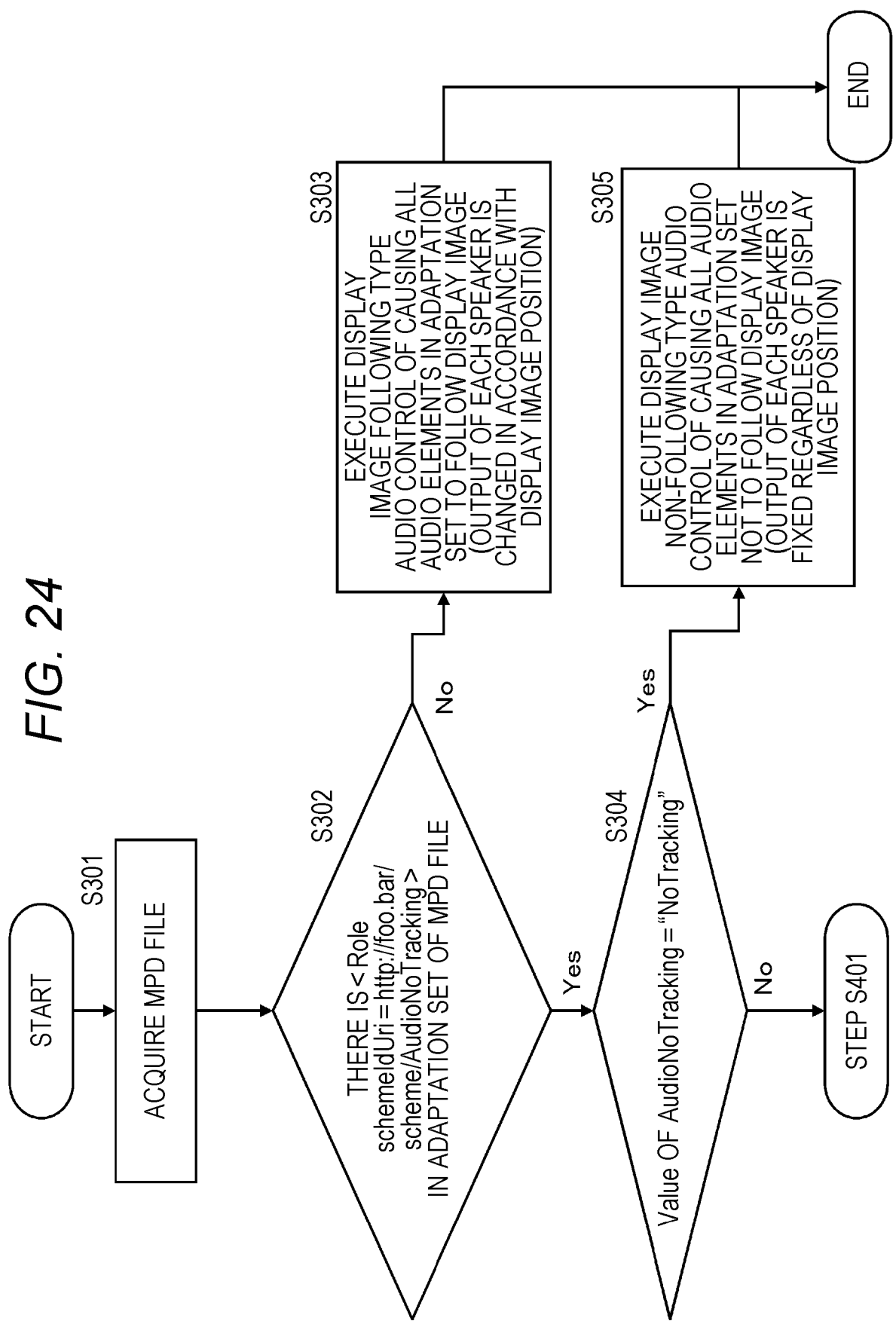

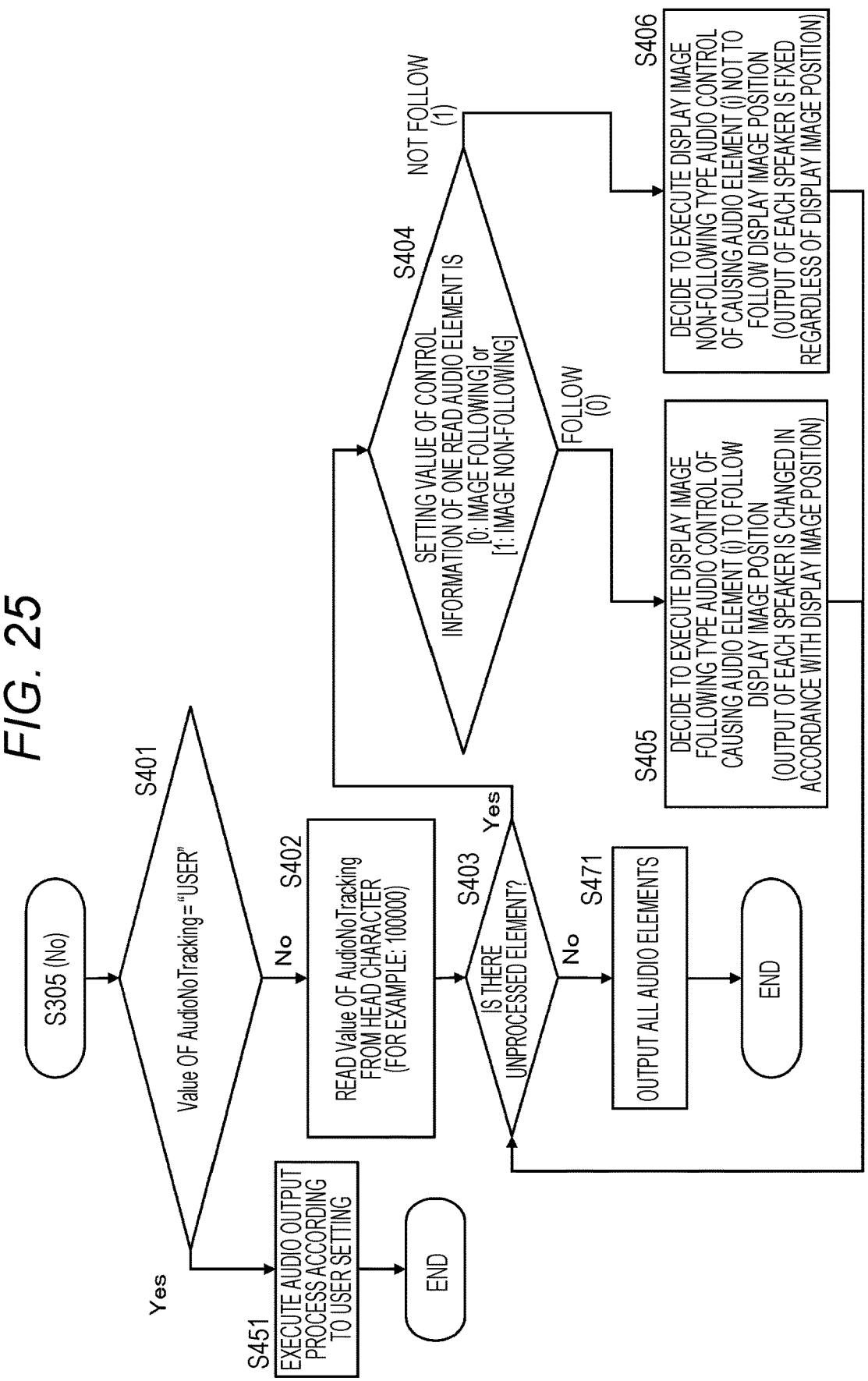

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/071111 (filed on Jul. 19, 2016) under 35 U.S.C. § 371, which claims priority to Japanese Patent Application No. 2015-155740 (filed on Aug. 6, 2015), which are all hereby incorporated by reference in their entirety.

TECHNICAL FIELD

The present disclosure relates to an information processing device, an information processing method, and a program. More specifically, the present disclosure relates to an information processing device, an information processing method, and a program, which are capable of controlling an output audio according to a display image in an image display configuration capable of observing images in various directions such as a celestial sphere image, an omnidirectional image, or a panorama image.

BACKGROUND ART

In recent years, imaging devices capable of capturing images in various directions such as a celestial sphere image, an omnidirectional image, or a panorama image have been developed, and systems in which the image captured using such an imaging device is displayed on a display unit of a PC, a tablet terminal, a mobile terminal, a head mount display (HMD), or the like, and an image selected by the user or an image automatically selected in accordance with a direction of the user can be observed are widely used.

For example, in the PC or the like, it is possible to acquire video (moving image) data of an omnidirectional image of a 360° range from an external server or read it from a recording medium and cause it to be displayed on the display device. The user is able to select an image in an arbitrary direction, cause the selected image to be displayed on the display device, and observe an image such as a moving image or a still image while changing a viewpoint freely.

The image displayed on the display unit of the PC, the tablet terminal, or the mobile terminal can be displayed in an observation direction moved by a mouse operation of the user or a slide process, a flick process, or the like performed on a touch panel, and the user is able to easily enjoy the image in various directions.

In a case where an image is displayed on the head mount display (HMD), it is possible to display an image according to a direction of the head of the user in accordance with sensor information obtained by detecting a motion or a direction of the head mounted on the HMD, and the user is able to feel as if the user were in the image displayed on the display unit of the HMD.

Such image display devices mostly have a function of outputting an audio together with an image.

In most of devices of a related art which output an image and an audio, a scheme of any one of the following types (a) and (b) is employed as an audio output control scheme:

(a) An image following type audio control scheme in which control is performed such that an audio listening direction is moved in accordance with movement of the observation image to follow an observation image.

(b) An image non-following type audio control scheme in which control is performed such that an audio listening direction is fixed regardless of movement of an observation image.

As described above, as the audio control scheme in the device of the related art, either (a) the image following type audio control scheme or (b) the image non-following type audio control scheme is often employed.

Further, (a) the image following type audio control scheme is disclosed, for example, in Patent Document 1 (Japanese Patent Application Laid-Open No. 2002-345097).

As an audio output together with an image, for example, in addition to an audio generated from a subject (object) included in the image, audios which are not generated by the subject in the image such as narration such as explanation of an image, comments, BGM and the like are included.

In the case of the audio generated from the subject in the image, a realistic feeling increases when the audio listening direction is moved with the movement of the image.

On the other hand, in the case of the audios which are not generated by the subject in the image such as narration such as explanation of an image, comments, and BGM, it is comfortable to hear if they are heard consistently in a fixed direction.

However, if control is performed such that an audio to follow an image is distinguished from an audio not to follow an image, a process is complicated, and it is difficult to implement control.

CITATION LIST

Patent Document

Patent Document 1: Japanese Patent Application Laid-Open No. 2002-345097

SUMMARY OF THE INVENTION

Problems to be Solved by the Invention

The present disclosure is made, for example, in light of the foregoing, and it is desirable to provide an information processing device, an information processing method, and a program which are capable of implementing audio source direction control for audios to be output together with an image in an image display device which outputs images in various directions in accordance with an operation or motion of the user such as an omnidirectional image.

Specifically, for example, it is desirable to provide an information processing device, an information processing method, and a program which are capable of implementing display image following type control or display image non-following type control in units of individual controllable audio elements such as audio streams, audio channels, and audio output objects which are individually controllable.

Solutions to Problems

A first aspect of the present disclosure lies in
an information processing device, including:
a display unit that is able to selectively display images in different directions; and
a data processing unit that controls an audio to be output to the display unit together with an image display,
in which the data processing unit executes,
in units of individual controllable audio elements, image following type audio control of moving an audio source direction in accordance with movement of the display image of the display unit and image non-following type audio control of not moving the audio source direction in accordance with the movement of the display image of the display unit.

Further, second aspect of the present disclosure lies in a data delivery server, including:

a data processing unit that generates a file storing image data including images in different directions which are selectively displayable, audio data to be output together with a display image which is selected from the image data and displayed, and audio control information indicating any one of image following type audio control and image non-following type audio control which is executed in units of individual controllable audio elements, the image following type audio control being executed such that an audio source direction is moved in accordance with movement of the display image, the image non-following type audio control being executed such that the audio source direction is not moved in accordance with the movement of the display image; and a communication unit that transmits the file generated by the data processing unit.

Further, a third aspect of the present disclosure lies in an information recording medium storing image data including images in different directions which are selectively displayable, audio data to be output together with a display image which is selected from the image data and displayed, and audio control information indicating any one of image following type audio control and image non-following type audio control which is executed in units of individual controllable audio elements, the image following type audio control being executed such that an audio source direction is moved in accordance with movement of the display image, the image non-following type audio control being executed such that the audio source direction is not moved in accordance with the movement of the display image, in which a reproducing device that reproduces read data from the information recording medium executes any one of the image following type audio control and the image non-following type audio control in units of individual controllable audio elements in accordance with the audio control information.

Further, a fourth aspect of the present disclosure lies in an information processing method of controlling output audio in an information processing device, the information processing device including a display unit that is able to selectively display images in different directions and a data processing unit that controls an audio to be output to the display unit together with an image display, the information processing method including:

executing, by the data processing unit, in units of individual controllable audio elements, image following type audio control of moving an audio source direction in accordance with movement of the display image of the display unit and image non-following type audio control of not moving the audio source direction in accordance with the movement of the display image of the display unit.

Further, a fifth aspect of the present disclosure lies in a program causing an information processing device to control an output audio, the information processing device including a display unit that is able to selectively display images in different directions, and a data processing unit that controls an audio to be output to the display unit together with an image display, the program causing the data processing unit to execute:

in units of individual controllable audio elements, image following type audio control of moving an audio source direction in accordance with movement of the display image of the display unit and image non-following type audio control of not moving the audio source direction in accordance with the movement of the display image of the display unit.

Further, for example, a program of the present disclosure is a program which can be provided by a storage medium or a communication medium which is provided to an information processing device or a computer system capable of executing various program codes in a computer readable format. Since the program is provided in a computer readable format, a process according to the program is implemented on the information processing device or the computer system.

Still other objects, features, and advantages of the present disclosure will become apparent from further detailed description based on embodiments of the present disclosure to be described later or the accompanying drawings. Further, in this specification, a term "system" indicates a logical aggregate configuration of a plurality of devices and not limited to a configuration in which devices of respective configurations are in the same housing.

Effects of the Invention

According to a configuration of one embodiment of the present disclosure, a device and a method which are capable of performing image following type audio control in which an audio source direction follows movement of a display image of a display unit or image non-following type audio control in units of individual audio elements are implemented.

Specifically, images in different directions are selectively displayed on the display unit, and an output audio is controlled in accordance with an image display. The data processing unit executes image following type audio control of moving an audio source direction in accordance with movement of the display image of the display unit and image non-following type audio control of not moving the audio source direction in accordance with the movement of an image in units of individual controllable audio elements. The data processing unit acquires audio control information from an MP4 file or a media presentation description (MPD) file and executes either the image following type audio control or the image non-following type audio control in units of audio elements in accordance with the acquired audio control information.

With this configuration, a device and a method which are capable of performing image following type audio control in which an audio source direction follows movement of a display image of a display unit or image non-following type audio control in units of individual audio elements are implemented.

Further, the effect described in this specification is merely an example and not limited, and additional effects may be included.

BRIEF DESCRIPTION OF DRAWINGS

FIG. 7 is a diagram for describing a recording example of audio control information for MP4 file.

FIG. 8 is a diagram for describing all-audio correspondence control information.

FIG. 9 is a diagram for describing a setting example of a recording order (sequence) of audio control information.

FIG. 10 is a diagram for describing audio element correspondence control information.

FIG. 14 is a diagram for describing audio control information recorded for an MP4 file.

FIG. 15 is a flowchart for describing reading of audio control information from an MP4 file and an execution sequence of an audio control process.

FIG. 20 is a diagram for describing audio control information recorded in an MPD file.

FIG. 21 is a diagram for describing a specific example of audio control information recorded in an MPD file.

FIG. 22 is a diagram for describing a specific example of audio control information recorded in an MPD file.

FIG. 23 is a diagram for describing a specific example of audio control information recorded in an MPD file.

FIG. 24 is a flowchart for describing reading of audio control information from an MPD file and an execution sequence of an audio control process.

FIG. 25 is a flowchart for describing reading of audio control information from an MPD file and an execution sequence of an audio control process.

MODE FOR CARRYING OUT THE INVENTION

Figure 1:
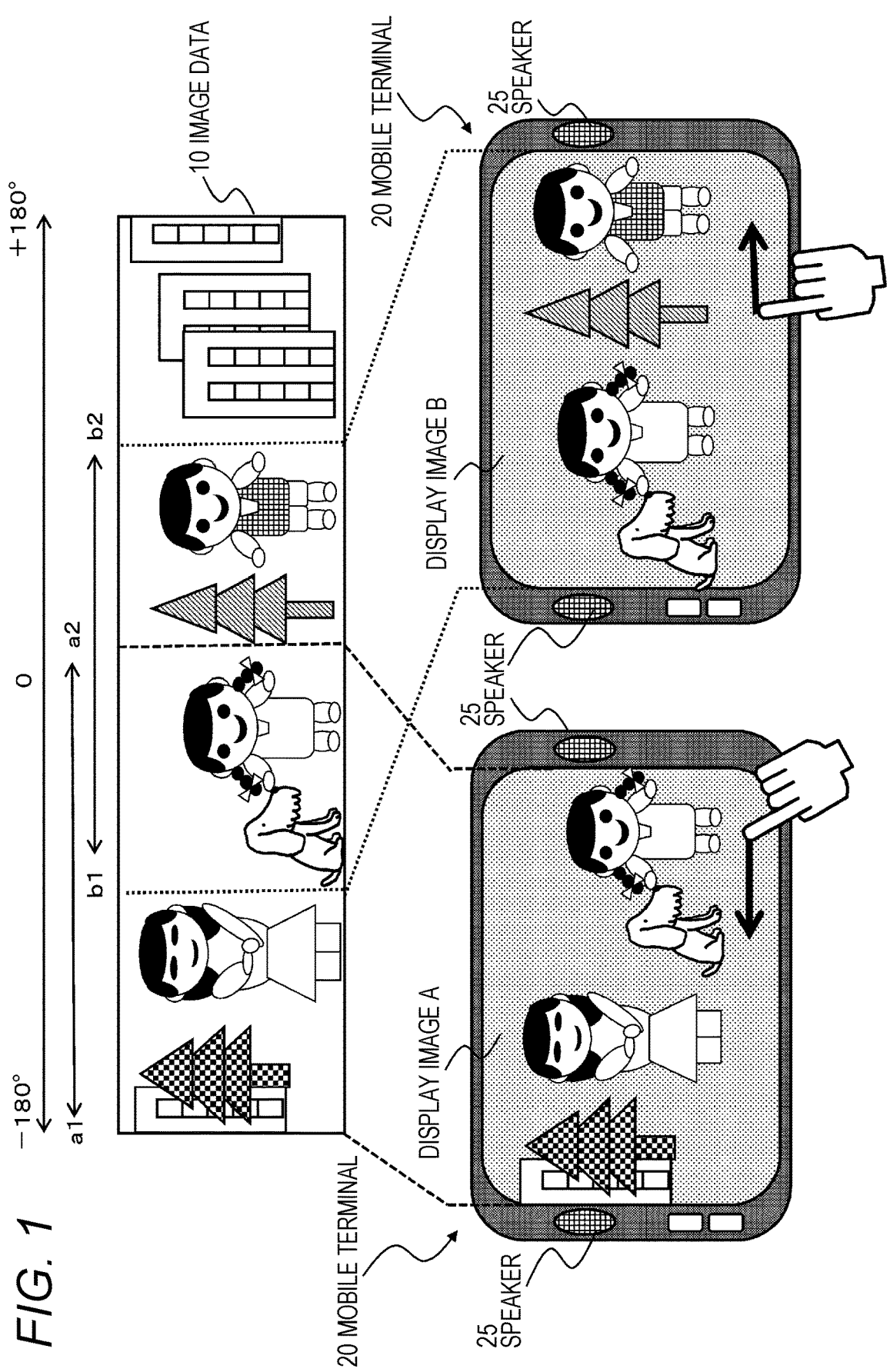
FIG. 1 is a diagram for describing examples of an image display process and an audio output process in an information processing device.

Hereinafter, an information processing device, an information processing method, and a program according to the present disclosure will be described in detail with reference to the accompanying drawings. Further, the description will proceed in accordance with the following items.

1. Examples of image display control and audio output control
2. (First embodiment) embodiment in which audio control information is recorded in MP4 file 2-1. (First audio control information recording example) recording example in which audio control information of channel unit is recorded in MP4 file
2-2. (Second audio control information recording example) example in which audio control information of stream unit is recorded in MP4 file
2-3. (Third audio control information recording example) example in which information indicating that audio control is settable by user is recorded in MP4 file
3. Audio control process sequence using audio control information recorded in MP4 file
4. (Second embodiment) embodiment in which audio control information is recorded in MPD
4-1. (First audio control information recording example) recording example in which audio control information of channel unit is recorded in MPD file
4-2. (Second audio control information recording example) example in which audio control information of stream unit is recorded in MPD file
4-3. (Third audio control information recording example) example in which information indicating that audio control is settable by user is recorded in MPD file
5. Audio control process sequence using audio control information recorded in MPD file
6. Hardware configuration example of information processing device
7. Conclusion of configuration of present disclosure 1. Examples of Image Display Control and Audio Output Control First, specific examples of image display control and audio output control in a device capable of displaying images in various directions such as a celestial sphere image, an omnidirectional image, or a panorama image on a display unit will be described with reference to FIG. 1 and subsequent drawings.

In recent years, imaging devices capable of capturing images in various directions such as a celestial sphere image, an omnidirectional image, or a panorama image have been developed, and systems in which the image captured using such an imaging device is displayed on a display unit of a PC, a tablet terminal, a mobile terminal, a head mount display (HMD), or the like, and an image in an arbitrary direction selected by the user can be observed are widely used.

For example, it is possible to acquire video (moving image) data of an omnidirectional image of a 360° range from an external server or read it from a recording medium and cause it to be displayed on the display device such as the PC of the user. The user is able to select an image in an arbitrary direction from the image data obtained from the server or the recording medium, cause the selected image to be displayed on the display device, and observe a video (moving image) or a still image while changing the viewpoint freely.

FIG. 1 is a diagram for describing an example in which images in various directions are selected and displayed on a display unit of the mobile terminal.

Image data 10 illustrated in FIG. 1 is a panorama image. An image of a 360° in a horizontal direction is set as one piece of image data.

If a central part of the image data is an image of the user (observer) in the front direction (for example, 0°=the north direction), a left end of the image data 10 is an image of the user (observer) in the rear direction (−1800=a south direction), and a right end of the image data 10 is an image of the user (observer) in the rear direction (+180°=the south direction).

The left end and the right end of the image data 10 are images at the same position.

Further, in the case of a celestial sphere image or an omnidirectional image, that is, a panorama image of 360°, an image of 180° is captured in an up and down direction, and images in all directions of up, down, right, and left are included.

In the following embodiment, an example using the panorama image of 360° in the horizontal direction will be described, but the configuration of the present disclosure can also be applied even in a case where a celestial sphere image or an omnidirectional image is used, and the configuration of the present disclosure can be applied in a device capable of selectively displaying images in different directions.

In the following description, the panorama image is assumed to include a panorama image of 360° in the horizontal direction, a 360° panorama image such as a celestial sphere image or an omnidirectional image, and all images in which images in different directions can be displayed by image movement.

A lower part of FIG. 1 illustrates a mobile terminal 20 which is an example of an information processing device of the user.

The display unit of the mobile terminal 20 is able to display images of some regions of the image data 10, for example, images of a region arbitrarily selected by the user.

A display image A of the mobile terminal 20 on the left side is a region image of partial sections of image sections a1 to a2 of some regions in the image data 10.

A display image B of the mobile terminal 20 on the right side is a region image of partial sections of image sections b1 to b2 of some regions in the image data 10.

The user is able to move the display image through a process of sliding a finger on the display unit configured as a touch panel or the like so that an image of an arbitrary region is displayed.

Further, the mobile terminal 20 is provided with a speaker 25, and outputs audio data recorded together with the display image.

Figure 2:
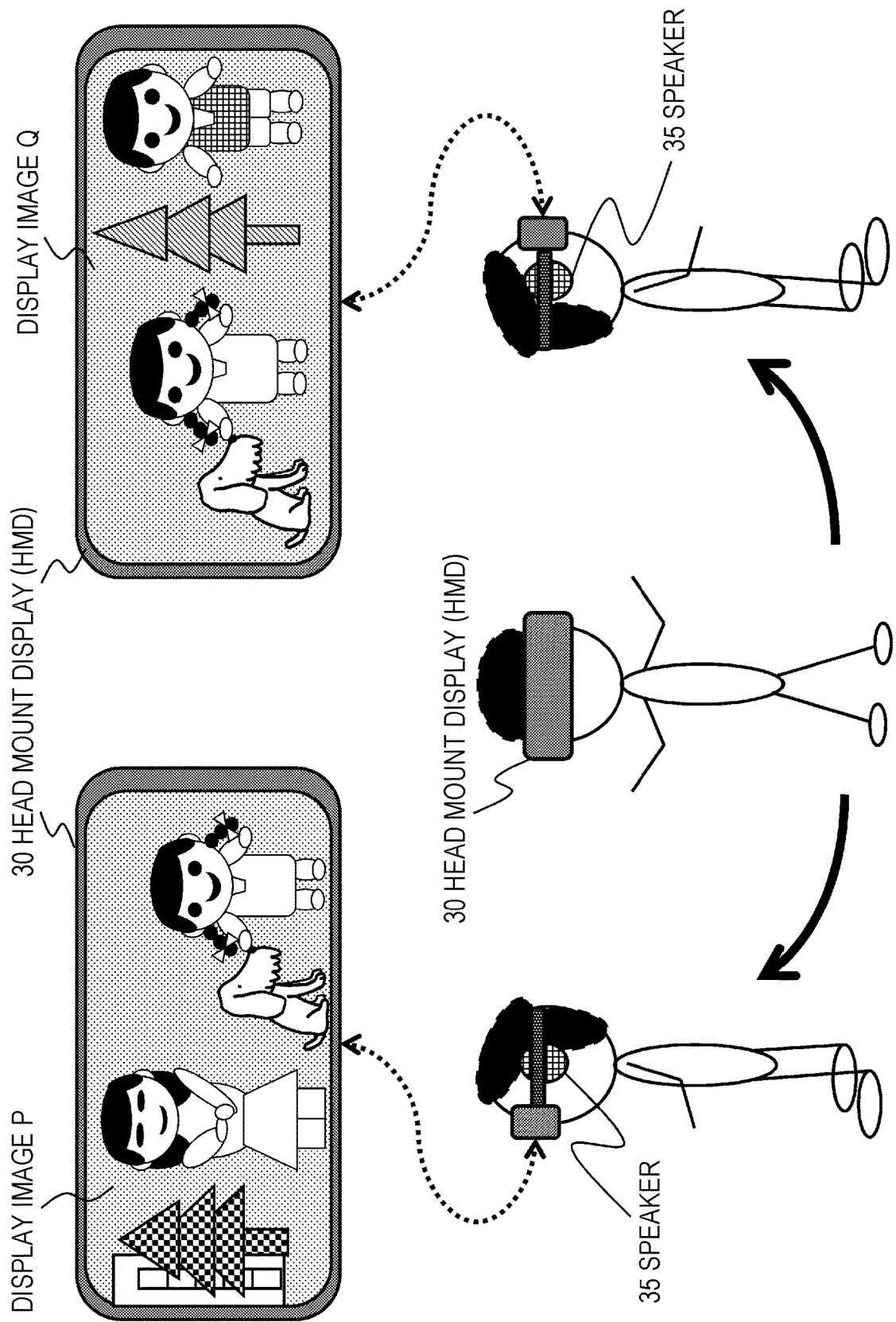
FIG. 2 is a diagram for describing examples of an image display process and an audio output process in an information processing device.

FIG. 2 illustrates an example in which a panorama image is displayed using a head mount display (HMD) 30.

In a case where an image is displayed on the head mount display (HMD) 30, an image corresponding to a direction of the head of the user is displayed in accordance with sensor information obtained by detecting a motion or a direction of the head wearing the HMD. With this image display control, the user is able to feel as if the user were in the image displayed on the display unit of the HMD.

An image when the user wearing the HMD 30 faces left is a display image P.

An image when the user wearing the HMD 30 faces right is a display image Q.

The user wearing the HMD 30 is able to observe an image of a 360° range while changing the direction of the body (head).

Further, the speaker 35 is also installed in the head mount display (HMD) 30 and outputs audio data recorded together with the display image.

Next, an audio output when the panorama image display process described with reference to FIGS. 1 and 2 is executed will be described with reference to FIG. 3.

As an audio output together with an image, for example, in addition to an audio generated from a subject (object) included in the image, audios which are not generated by the subject in the image such as narration such as explanation of an image, comments, and BGM are included.

Figure 3:
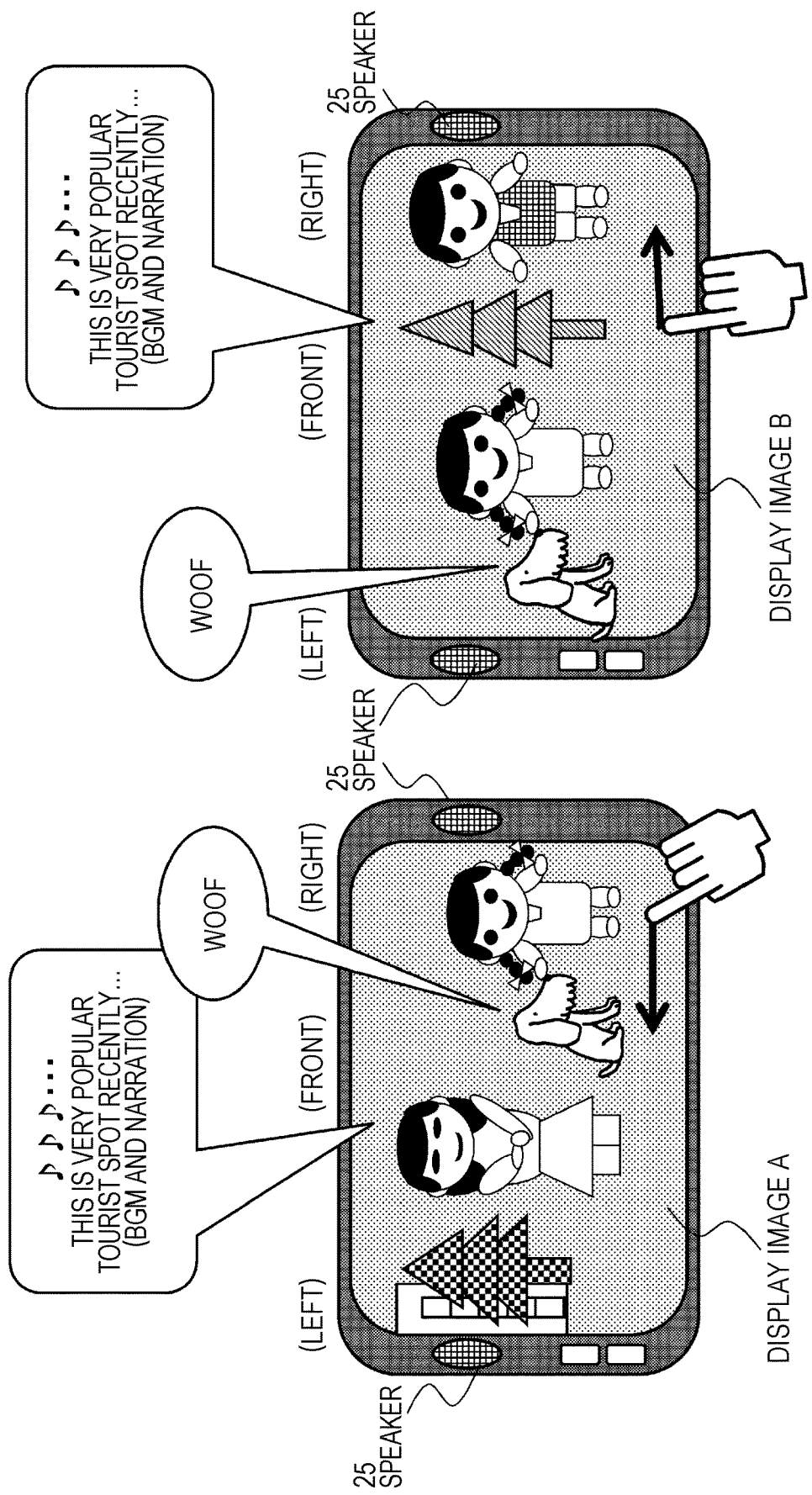
FIG. 3 is a diagram for describing examples of an image display process and an audio output process in an information processing device.

FIG. 3 illustrates an example of two types of output audios:

(First audio example) dog barking (woof) (=an audio generated from a subject (object)); and (Second audio example) BGM and narration (which are not an audio generated from a subject (object))

The dog barking (woof) illustrated in FIG. 3 is an audio generated from the subject in the image, and the realistic feeling increases if the audio listening direction is moved in accordance with movement of an image.

It is possible to further increase the realistic feeling when "image following type" audio control of performing a setting so that the dog barking (woof) is heard from a "right front" in the case of the display image A illustrated in FIG. 3, and the dog barking (woof) is heard from a "left front" in the case of the display image B is performed.

However, in the case of audios such as BGM or narration which are not audios generated from the subject (object), it is comfortable to hear if they are heard consistently in a fixed direction.

For example, it is preferable to perform "image non-following type" audio control of performing a setting so that the audios are heard consistently in the front direction regardless of the position of the display image.

A specific embodiment for implementing such audio control will be described below.

2. (First Embodiment) Embodiment in which Audio Control Information is Recorded in MP4 File First, an embodiment in which audio control information is recorded in an MP4 file will be described as a first embodiment.

Figure 4:
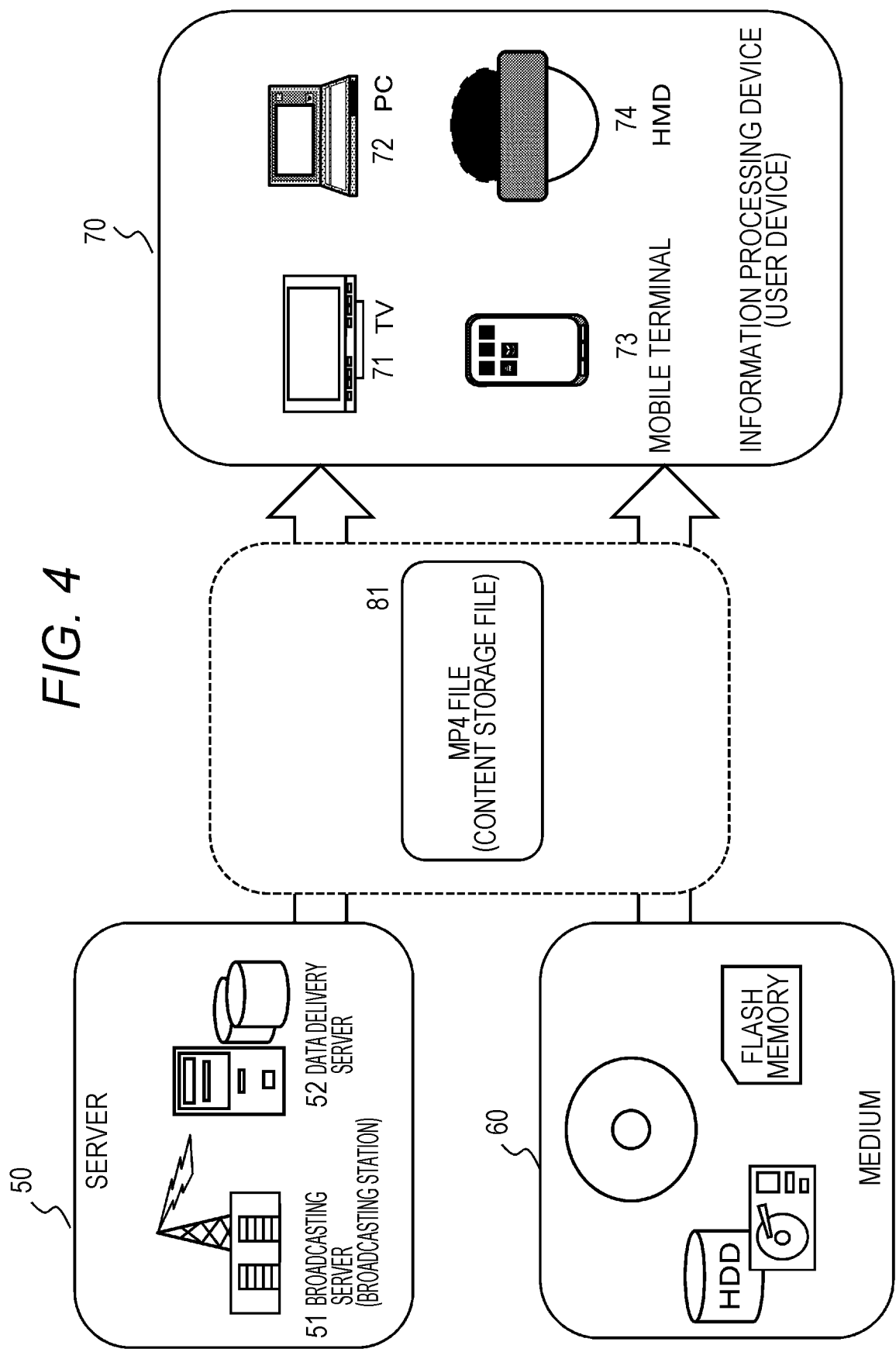
FIG. 4 is a diagram for describing a data provision process configuration for an information processing device.

FIG. 4 is a diagram illustrating an information processing device 70 which executes audio control of the present disclosure according to the first embodiment, a server 50 which provides content including image data and audio data to the information processing device 70, and a medium 60.

For example, image data such as a celestial sphere image, an omnidirectional image, or a panorama image and audio data are provided from the server 50 illustrated in FIG. 4 to the information processing device 70. Alternatively, the image data and the audio data are provided from the medium 60 illustrated in FIG. 4 to the information processing device 70.

The server 50 includes, for example, a broadcasting server 51 of a broadcasting station or the like and other data providing servers 52.

The content is transmitted to the information processing device 70 via a broadcast wave or a network such as the Internet.

The information processing device 70 receives and reproduces the content transmitted from the server 50 via a broadcast wave or a network such as the Internet.

Further, the medium 60 includes various media such as a disk, a flash memory, a hard disk, and the like, which are loaded into the information processing device.

The information processing device 70 reads and reproduces the contents recorded in the medium.

An information processing device which performs content reproduction is, for example, a TV 71, a PC 72, a mobile terminal 73, a head mount display (HMD) 74, or the like and includes an image display unit and an audio output unit (speaker).

The content provided from the server 50 or the medium 60 to the information processing device 70 is content including image data in which images in various directions can be selectively displayed such as a celestial sphere image, an omnidirectional image, or a panorama image and audio data.

The content is stored, for example, in an MP4 file 81 and provided.

The MP4 file 81 is a file in which data is recorded in accordance with the ISO base media file format.

The ISO base media file format is a data format which is defined by ISO/IEC 14496-12 and suitable for recording data, for example, a flash memory or the like or storage data of a transmission data file via a broadcast wave or a network.

The ISO base media file format is used, for example, when encoded data which is content configuration data such as an image (Video), an audio (Audio), and a subtitle (Subtitle) or metadata (attribute information) related to the data is recorded in a recording medium (medium). Further, the ISO base media file format is also used as a data storage format of data transmitted via a broadcast wave or a network.

In recent years, many mobile terminals have a reproducing application capable of reproducing MP4 data recorded in accordance with the ISO base media file format, and in a case where content is recorded in a medium of a mobile terminal, it is often requested to record the content in an MP4 format.

An overview of the ISO base media file format will be described with reference to FIGS. 5 and 6.

Figure 5:
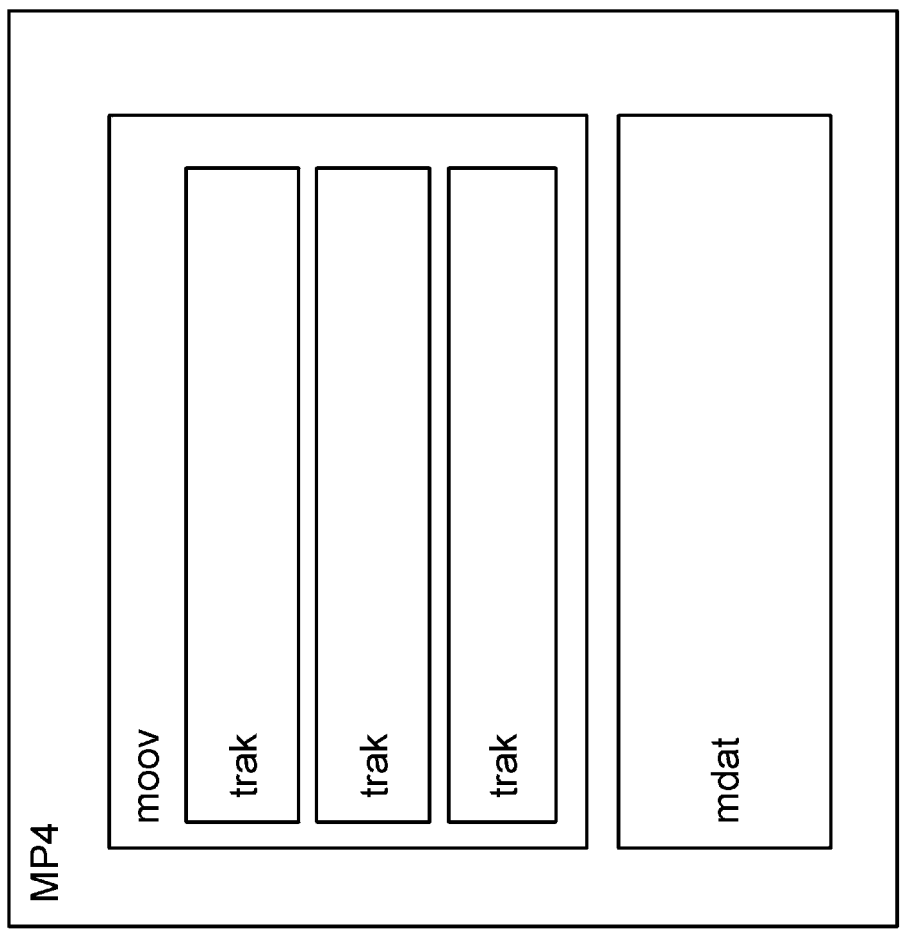
FIG. 5 is a diagram for describing an ISO base media file format.

FIG. 5 illustrates an example of the ISO base media file format specified in ISO/IEC 14496-12.

An MP4 file illustrated in FIG. 5 is a file set as one processing unit in a data recording or reproduction process according to the ISO base media file format.

In the MP4 file, regions of box units are set, and data defined in units of boxes is stored in each box.

Each box has regions of a box size (box-size), a box type (box-type), and box data (box-data).

A data length (byte size) of the box is recorded in the box size (box-size).

A type of data stored in the box is recorded in the box type (box-type).

Data of a type indicated by the box type is recorded in the box data (box-data).

The following types of boxes are set in the MP4 file illustrated in FIG. 5:
 moov box;
 trak box; and
 mdat box.

Each of the above boxes is set.

Actual data which is reproduction target data such as an image, an audio, and a subtitle is stored in the mdat box.

Further, metadata such as attribute information and reproduction control information related to data stored in the mdat box is stored in the trak box in the moov box.

The moov box is a box set as a storage region of the metadata (the reproduction control information and the attribute information) of the data stored in the mdat box of the MP4 file.

One or more trak boxes are set in the moov box. The trak box can be set for each data type such as an image, an audio, and a subtitle, for example, and stores the metadata of each data.

A data storage configuration example for the MP4 file will be described with reference to FIG. 6. The following boxes are set in the MP4 file as described above:
 moov box;
 trak box; and
 mdat box.

Each of the above boxes is set.

For example, the following data is stored in the mdat box:
 (a) image;
 (b) audio; and
 (c) subtitle.

The data stored in the mdat box which is a data part of the ISO base media file format is divided into samples serving as a basic data unit.

A set of only image samples, a set of only audio samples, a set of only subtitle samples, or a set of the same kind of data samples are stored in one mdat box.

The moov box is a storage region of the metadata (the reproduction control information and the attribute information) of the data stored in the mdat box of the MP4 file.

One or more trak boxes are set in the moov box. The trak box can be set for each data type such as an image, an audio, and a subtitle, and stores the metadata of each data.

Figure 6:
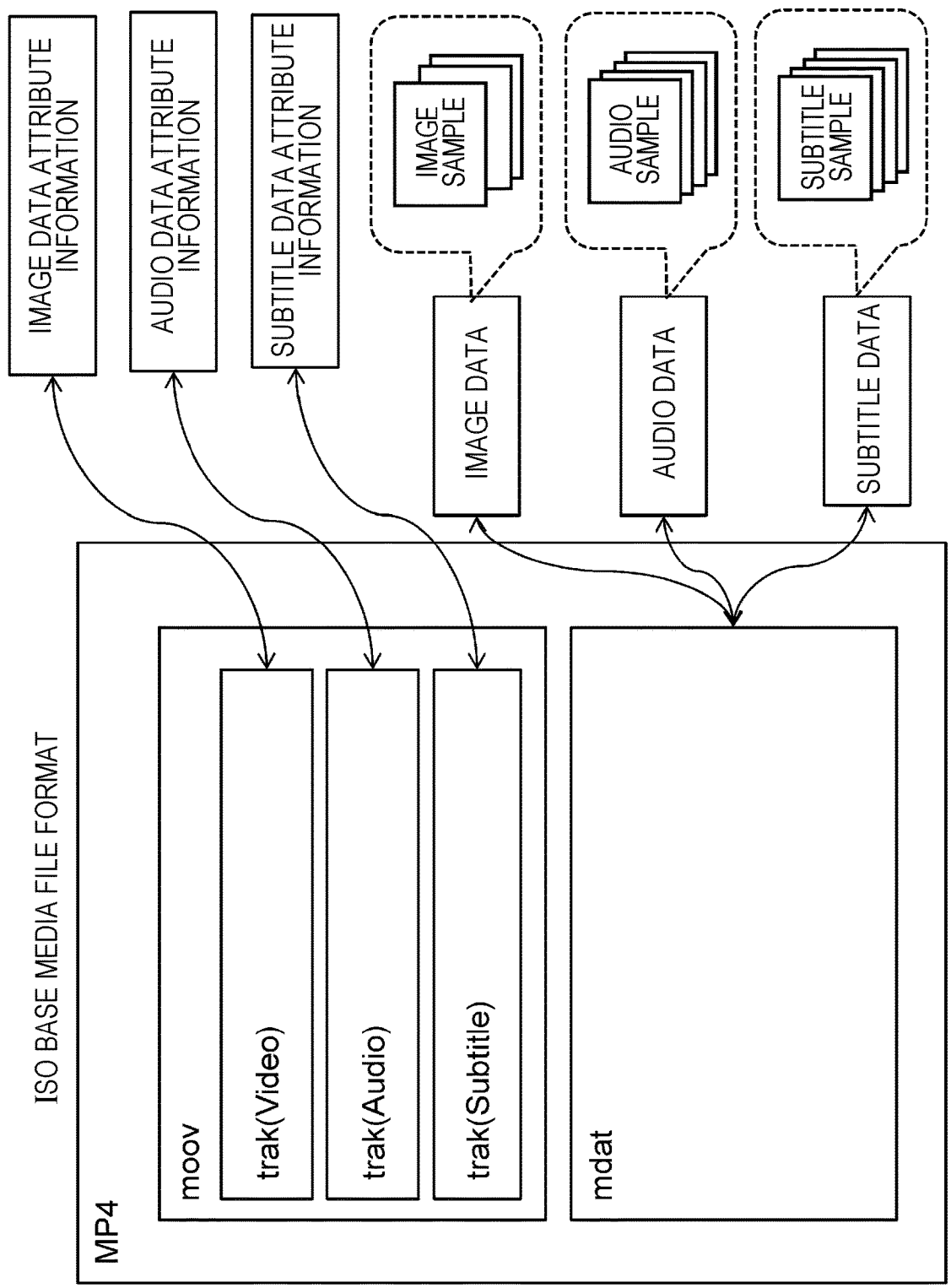
FIG. 6 is a diagram for describing an ISO base media file format.

A trak (Video) box illustrated in FIG. 6 is an image correspondence metadata storage box which stores attribute information and control information related to the image data.

A trak (Audio) box is an image correspondence metadata storage box which stores attribute information and control information related to audio data.

A trak (Subtitle) box is an image correspondence metadata storage box which stores attribute information and control information related to subtitle data.

Further, in a case where a plurality of different pieces of image data, for example, a 2K image, a 4K image, and the like are included in the reproduced data stored in the MP4 file, it is possible to record control information of an image type unit in the trak (Video) box.

Further, in a case where a plurality of different pieces of audio data, for example, a Japanese audio, an English audio, and the like are included in the storage audio data of the MP4 file, it is possible to record individual control information of an audio channel unit corresponding to the audio types into individual trak (Audio) boxes.

Further, for the BGM, the narration, the subject (object) audio, and the like, it is also possible to record individual control information of each audio channel (including an audio output object) unit in the trak (Audio) box.

Further, it is also possible to set the individual trak boxes in accordance with, for example, an audio channel corresponding to a speaker to be output to each speaker.

For example, it is possible to record two pieces of control information corresponding to the output audios output from two left and right speakers corresponding to a stereo output in the trak (Audio) box.

Further, in the case of a 5.1 ch surround audio, the following six speakers are set:
 a center front (Center Front) speaker;
 a left front (Left Front) speaker;
 a right front (Right Front) speaker;
 a left surround (Left Surround) speaker;
 a right surround (Right Surround) speaker; and
 a low frequency effect (low frequency enhancement: LFE) speaker.

In the case of the 5.1 ch surround audio, six audio channels which are output audios to be output to the six speakers are recorded in the MP4 file.

It is possible to record six pieces of control information corresponding to the six audio channels (audio elements) in the trak (Audio) box.

If the control information of such an audio element unit is recorded, it is possible to individually control the output audio of each speaker.

Thus, it is possible to record individual control information of each of individually controllable audio elements such as an audio type, an audio output object, and an audio channel which is distinguished by an audio output speaker or the like in the trak box.

It is possible to perform the individual audio control of the audio element unit in accordance with the control information of the audio element unit recorded in the trak box.

Next, a specific control information recording example corresponding to an audio recorded in the trak (Audio) box will be described with reference to FIG. 7.

The control information recorded in the trak (Audio) box is recorded as data illustrated in FIG. 7.

In other words, it is the following data.

```
aligned(8) class NoTrackingAudio extends
FullBox('NTRK'){
        unsigned int(8) no_tracking_flags;
        if(no_tracking_flag & Some_Channel){
            unsigned int(8) count; // channel
            for (i=1; i<=count; i++){
                unsigned int(1) NoTracking;
            }
            aligned(8);
        }
}
```

"no_tracking_flags"
of the control data is
"all-audio correspondence control information 91"
as illustrated in FIG. 7.

A setting value of the "all-audio correspondence control information 91" is information indicating a general control form for all audio elements such as all audio channels or all audio output objects stored in the MP4 file.

An example of a correspondence relation between the setting value (flag value) set in "no_tracking_flags" which is the "all-audio correspondence control information 91" and the control form of the audio is illustrated in FIG. 8.

As illustrated in FIG. 8, correspondence between the setting value (flag value) and the audio control form is as follows:

setting value=0: all audios are caused to follow a display image (All channels can be tracked);

setting value=1: all audios are caused not to follow a display image (All channels are not tracked);

setting value=2: a display image following audio and a non-following audio are mixed (Some channels can be tracked); and setting value=4: display image following audio and non-following audio are settable by the user (User selected channels can be tracked).

In a case where the setting value of the "all-audio correspondence control information 91 (no_tracking_flags) is 0, control is performed such that all individual controllable audio elements stored in the MP4 file are caused to follow the display image.

In other words, in a case where the display image moves, a process of moving the audio source direction to follow the movement is performed. In other words, it is "display image following type audio control."

The "display image following type audio control" is audio source direction control of the dog barking (woof) in the example described above with reference to FIG. 3. In other words, in the example of FIG. 3, the process of moving the audio source direction of the dog barking (woof) to follow the display image has been described.

In a case where the setting value of the "all-audio correspondence control information 91 (no_tracking_flags) is 0 in a configuration including a plurality of audio elements described above with reference to FIG. 3, control of moving all audios such as audios such as the BGM and the narration as well as the audio of the dog barking (woof) in accordance with movement of a display screen is performed.

In a case where the setting value of the "all-audio correspondence control information 91 (no_tracking_flags) is 1, control is performed such that all individual controllable audio elements stored in this MP4 file are caused not to follow the display image.

In other words, in a case where the display image moves, the process of moving the audio source direction to follow the movement is not performed. In other words, it is "display image non-following type audio control."

The "display image non-following type audio control" is an audio source direction control of the audio such as the BGM or the narration in the example described above with reference to FIG. 3. In other words, in the example of FIG. 3, the control of performing a setting so that the audios such as the BGM and the narration are heard from a fixed audio source direction, for example, consistently in the front direction without following the display image has been described.

In a case where the setting value of the "all-audio correspondence control information 91 (no_tracking_flags) is 1 in the configuration including a plurality of audio elements described with reference to FIG. 3, the audio control of not moving all audios such as the audio of the dog barking (woof) as well as the audios such as the BGM and the narration in accordance with the movement of the display screen is performed.

In a case where the setting value of the "all-audio correspondence control information 91 (no_tracking_flags) is 2, it indicates that the display image following audio and the display image non-following audio are mixed in all the individual controllable audio elements stored in this MP4 file.

In this case, one of the "display image following type audio control" and the "display image non-following type audio control" which is performed on each audio element element is decided from a loop processing portion 92 illustrated in FIG. 7 with reference to control information corresponding to an audio element element (i), that is, "audio element (i) correspondence control information (No Tracking)" illustrated in FIG. 7.

A process of acquiring the control information corresponding to the audio element element (i) based on recording information of the loop processing portion 92 will be described later.

In a case where the setting value of the "all-audio correspondence control information 91 (no_tracking_flags) is 4, it indicates that the user is able to set the display image following audio and the display image non-following audio for all the individual controllable audio elements stored in the MP4 file.

Next, a process of acquiring the control information corresponding to the audio element element (i) on the basis of the recording information of the loop processing portion 92 in a case where the setting value of the "all-audio correspondence control information 91 (no_tracking_flags) is 2 will be described.

In a case where the setting value of the "all-audio correspondence control information 91 (no_tracking_flags) is 2, it indicates that the display image following audio and the image display non-following audio are mixed in all the individual controllable audio elements stored in the MP4 file.

In this case, one of the "display image following type audio control" and the "display image non-following type audio control" which is performed on each audio element element is decided from the loop processing portion 92 illustrated in FIG. 7 with reference to the control information corresponding to the audio element element (i), that is, the "audio element (i) correspondence control information (No Tracking)" illustrated in FIG. 7.

Information indicating whether the individual controllable audio element is an execution target of the "display image following type audio control" or an execution target of "display image non-following type audio control" is recorded in the loop processing portion 92 for all the individual controllable audio elements stored in the MP4 file.

The number of all audio elements is recorded in the number of channels (count) 94.

Information indicating whether control information for each element (i), that is, the audio element (i) is an execution target of the "display image following type audio control" or an execution target of the "display image non-following type audio control" is recorded in the loop processing portion 92 for audio element identifiers i=1 to count.

Further, the recording order of the audio element correspondence control information in the loop processing portion 92 differs depending on stored audio data. For example, an order determined by ISO/IEC 23001-8 Channel Configuration is used.

In this case, the audio element correspondence control information associated with the output channel of each audio output speaker is sequentially recorded in the loop processing portion 92 in accordance with a sequence specified in ISO/IEC 23001-8.

An example of the recording order of the audio element correspondence control information according to the sequence recorded in ISO/IEC 23001-8 will be described with reference to FIG. 9.

In the case of the MP4 file in which a stereo audio is stored, the number of output channels=the number of output speakers=2, and the number of individual controllable audio elements (the number of channels)=2. In this case, the number of records of the audio element correspondence control information in the loop processing portion 92 illustrated in FIG. 7 is 2, and count=2.

In this case, the following control information is recorded in the loop processing portion 92 illustrated in FIG. 7 in the described order:

a first audio element=control information of an output channel of a left front speaker; and a second audio element=control information of an output channel of a right front speaker.

In other words, the "audio element (i) correspondence control information (NoTracking)" indicating whether each audio element is the execution target of the "display image following type audio control" or the execution target of the "display image non-following type audio control" is recorded in the order of the first audio element and the second audio element.

Further, in the case of MP4 file storing the 5.1 channel surround audio, the number of channels=the number of output speakers=6, and the number of individual controllable audio elements (the number of channels)=6. In this case, the number of records of the audio element correspondence control information in the loop processing portion 92 illustrated in FIG. 7 is 6, and count=6.

In this case, the following control information is recorded in the loop processing portion 92 illustrated in FIG. 7 in the described order:

a first audio element=control information of an output channel of a center front (Center Front) speaker;

a second audio element=control information of an output channel of a left front (Left Front) speaker;

a third audio element=control information of an output channel of a right front (Right Front) speaker;

a fourth audio element=control information of an output channel of a left surround (Left Surround) speaker;

a fifth audio element=control information of an output channel of a right surround (Right Surround) speaker; and a sixth audio element=control information of an output channel of a low frequency effect (LFE) speaker.

In other words, the "audio element (i) correspondence control information (NoTracking)" indicating whether each audio element is the execution target of the "display image following type audio control" or the execution target of the "display image non-following type audio control" is recorded in the order of the first to sixth audio elements.

The example described with reference to FIG. 9 is an example in which the controllable audio element is associated with the output channel of each speaker, and the audio element correspondence control information is recorded in accordance with the sequence recorded in ISO/IEC 23001-8.

In addition to this example, the individual controllable audio element stored in the MP4 file has various settings, and recording order sequences corresponding to various audio elements according to the settings are specified.

Control information corresponding to each audio element (i), that is, "audio element (i) correspondence control information (NoTracking) 93" illustrated in FIG. 7 is recorded in the loop processing portion 92 in the specified order. In other words, information indicating whether each audio element element is a target of the "display image following type audio control" or a target of the "display image non-following type audio control" is recorded.

Further, it is desirable that the recording order information be separately provided to the information processing device 70.

A specific example of the "audio element (i) correspondence control information (NoTracking) 93" recorded in the loop processing portion 92 will be described with reference to FIG. 10.

An example of a correspondence relation between the setting value set in the "audio element (i) correspondence control information (NoTracking) 93" and the audio control form is illustrated in FIG. 10.

As illustrated in FIG. 10, correspondence between the setting value and the control form of audio is as follows:

a setting value=0: the audio element (i) is caused to follow the display image (the channel can be tracked); and a setting value=1: the audio element (i) is caused not the follow display image (the channel is not tracked).

In a case where the setting value of the "audio element (i) correspondence control information (NoTracking) 93" is 0, control is performed such that the audio element element (i) stored in the MP4 file is caused to follow the display image.

In other words, in a case where the display image moves, a process of moving the audio source direction to follow the movement is performed. In other words, it is "display image following type audio control."

In the "display image following type audio control," similarly to the audio source direction control of the dog barking (woof) in the example described above with reference to FIG. 3, in a case where the display image moves, the process of moving the audio source direction to follow the movement is performed.

In a case where the setting value of "audio element (i) correspondence control information (NoTracking) 93" is 1, control is performed such that the audio element element (i) stored in the MP4 file is caused not to follow the display image.

In other words, in a case where the display image moves, the process of moving the audio source direction to follow the movement is not performed. In other words, it is the "display image non-following type audio control."

In the "display image non-following type audio control," similarly to the audio source direction control of the audio such as the BGM or the narration in the example described above with reference to FIG. 3, even when the display image moves, the audio source direction control of causing the audio not to follow the movement is performed.

The value [0] or [1] of the audio element (i) correspondence control information (NoTracking) illustrated in the table illustrated in FIG. 10 is stored in the loop processing portion 92 illustrated in FIG. 7 as the setting value of each piece of audio element (i) correspondence control information.

An example of control based on the setting value of each piece of audio element (i) correspondence control information recorded in the loop processing portion 92 illustrated in FIG. 7 will be described with reference to FIG. 11.

Figure 11:
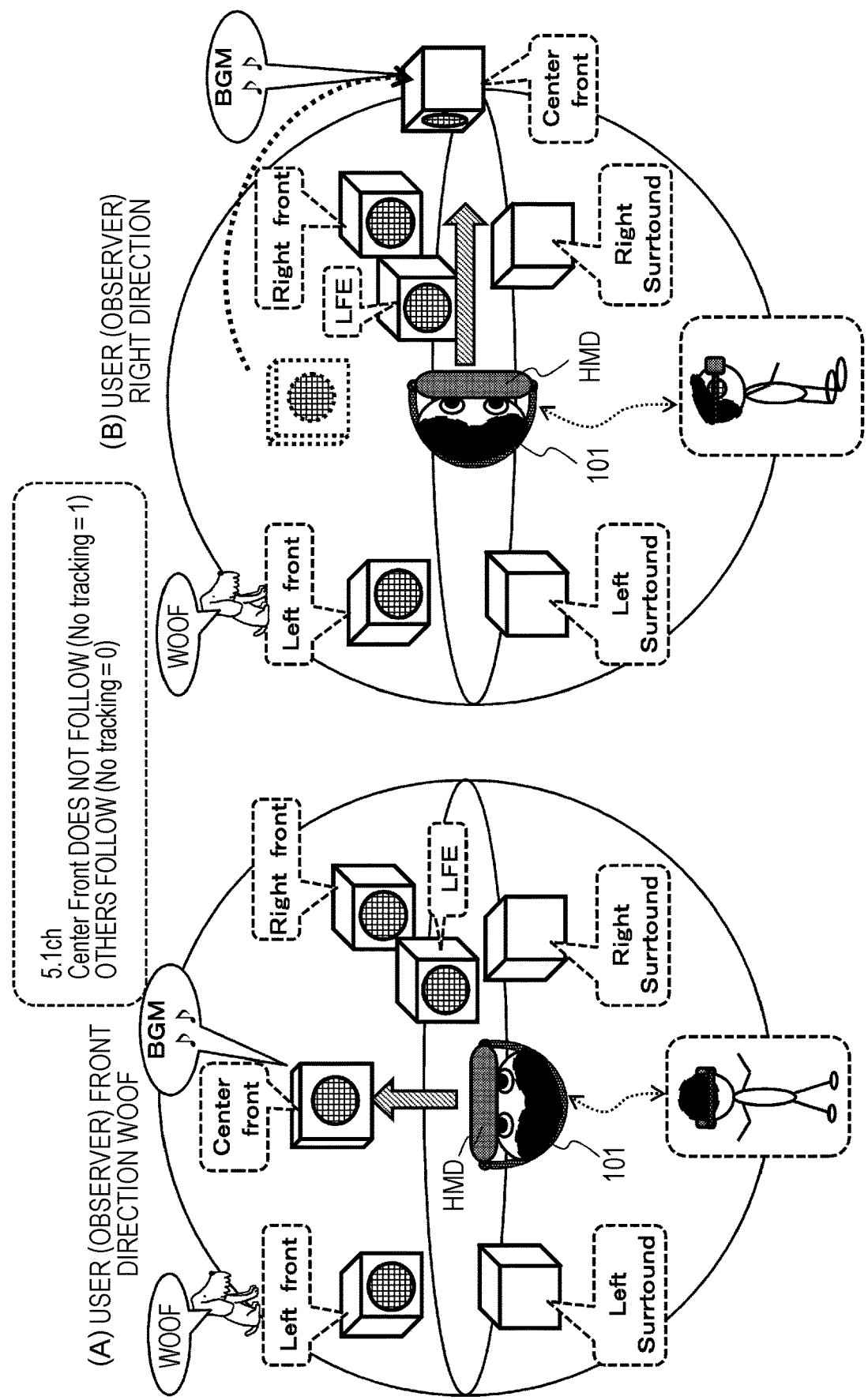
FIG. 11 is a diagram for describing an example of audio control.

FIG. 11 is a diagram illustrating a control example in the case of the MP4 file storing the 5.1 channel surround audio described above with reference to FIG. 9.

In the case of the MP4 file storing the 5.1 channel surround audio, the number of channels=the number of output speakers=6, and the number of individual controllable audio elements (the number of channels)=6. In this case, the number of records of the audio element correspondence control information in the loop processing portion 92 illustrated in FIG. 7 is 6, and count=6.

In this case, the following control information is recorded in the loop processing portion 92 illustrated in FIG. 7 in the described order:

a first audio element=control information of an output channel of a center front speaker;

a second audio element=control information of an output channel of a left front speaker;

a third audio element=control information of an output channel of a right front speaker;

a fourth audio element=control information of an output channel of a left surround speaker;

a fifth audio element=control information of an output channel of right surround speaker; and a sixth audio element=control information of an output channel of a low frequency effect (LFE) speaker.

The control example illustrated in FIG. 11 is an example of control in a case where the setting value of the "audio element (i) correspondence control information (NoTracking) 93" recorded in the loop processing portion 92 illustrated in FIG. 7 has the following setting:

a setting value of control information of a first audio element (the output channel of the center front speaker)=1;

a setting value of control information of a second audio element (the output channel of the left front speaker)=0;

a setting value of control information of a third audio element (the output channel of the right front speaker)=0;

a setting value of control information of a fourth audio element (the output channel of the left surround speaker)=0;

a setting value of control information of a fifth audio element (the output channel of the right surround speaker)=0; and a setting value of control information of a sixth audio element (the output channel of the low frequency effect (LFE) speaker)=0.

The above setting values are setting values indicating that the audio control of causing the audio not to follow the movement of the display image, that is, the "display image non-following type audio control" is performed only on the first audio element (the output channel of the center front speaker), and the audio control of causing the audio to follow the movement of the display image, that is, the "display image following type audio control" is performed on the second to sixth audio elements.

For example, specifically, the BGM or the narration is output from the first audio element (the output channel of the center front speaker), and output audios of the subject in the display image are output from the other speakers.

This corresponds to such a setting.

A user (observer) 101 illustrated in FIG. 11 wears a head mount display (HMD) and observes an omnidirectional image or a panorama image. Control is performed such that an observation image moves in accordance with the direction of the head of the user.

Further, the six speakers illustrated in FIG. 11 are virtual speakers and do not actually exist.

The speaker is installed in the HMD worn by the user 101 and is configured to output a pseudo 5.1 ch surround audio through headphones of the left and right ears.

Here, six individual controllable audio elements corresponding to output audios of the six speakers corresponding to the 5.1 ch surround are recorded in the MP4 file and controlled in accordance with the audio element correspondence control information.

In (A) a user (observer) front direction setting illustrated in FIG. 11, the BGM and the narration are set to be heard from the virtual center front speaker (Center front) in the front.

The center front speaker (Center front) is the first audio element which outputs the BGM and the narration.

Other audios, for example, audios output from the subjects in the observation image, for example, the dog barking and the like are set to be heard from the other speakers.

The other speakers are the second to sixth audio elements which output the subject audios and the like.

In the example illustrated in FIG. 11 (A), the dog barking is heard from the left front (Left Front) speaker.

Then, if the user 101 rotates the body in (B) a user (observer) right direction setting illustrated in FIG. 11, an image displayed on the HMD also moves with the rotation.

However, in the BGM or the narration, the first audio element (the output channel of the center front speaker) is an audio element not following the display image. In other words, a direction in which the BGM or the narration is heard is the same position to the user, and a relative position relation between the audio source and the user is not changed.

Therefore, even when the user 101 rotates the body in (B) the user (observer) right direction setting, the BGM and the narration are set to be heard from the front of the user, that is, from the right side in FIG. 11.

Thus, a similar effect to when the first audio element (center front speaker) rotates with the rotation of the user is obtained.

On the other hand, for example, the second to sixth audio elements corresponding to the outputs from the other speakers such as the dog barking are audio elements following the display image. In other words, the direction in which the subject audio such as the dog barking (woof) is heard moves with the movement of the observation image of the user. In this case, the relative position relation between the audio source direction and the user is changed.

If the user 101 rotates the body to (B) the user (observer) right direction setting, the dog barking is set to be heard from the left rear speaker of the user, that is, the virtual left front (Left Front) speaker.

As described above, the information processing device 70 executes control of each audio element on the basis of the recorded value of the audio element correspondence control information recorded in the loop processing portion illustrated in FIG. 7.

The audio control information illustrated in FIG. 7 is recorded in the trak box which is the control information (metadata) recording region corresponding to the audio (Audio) of the MP4 file described above with reference to FIGS. 5 and 6.

It is possible to record various control information in the trak box which is an audio control information recording region.

Two examples of the recording positions set in the trak box in which the audio control information illustrated in FIG. 7 is recorded will be described with reference to FIGS. 12 and 13.

(First Control Information Storage Example)
A first control information storage example illustrated in FIG. 12 will be described.

Figure 12:
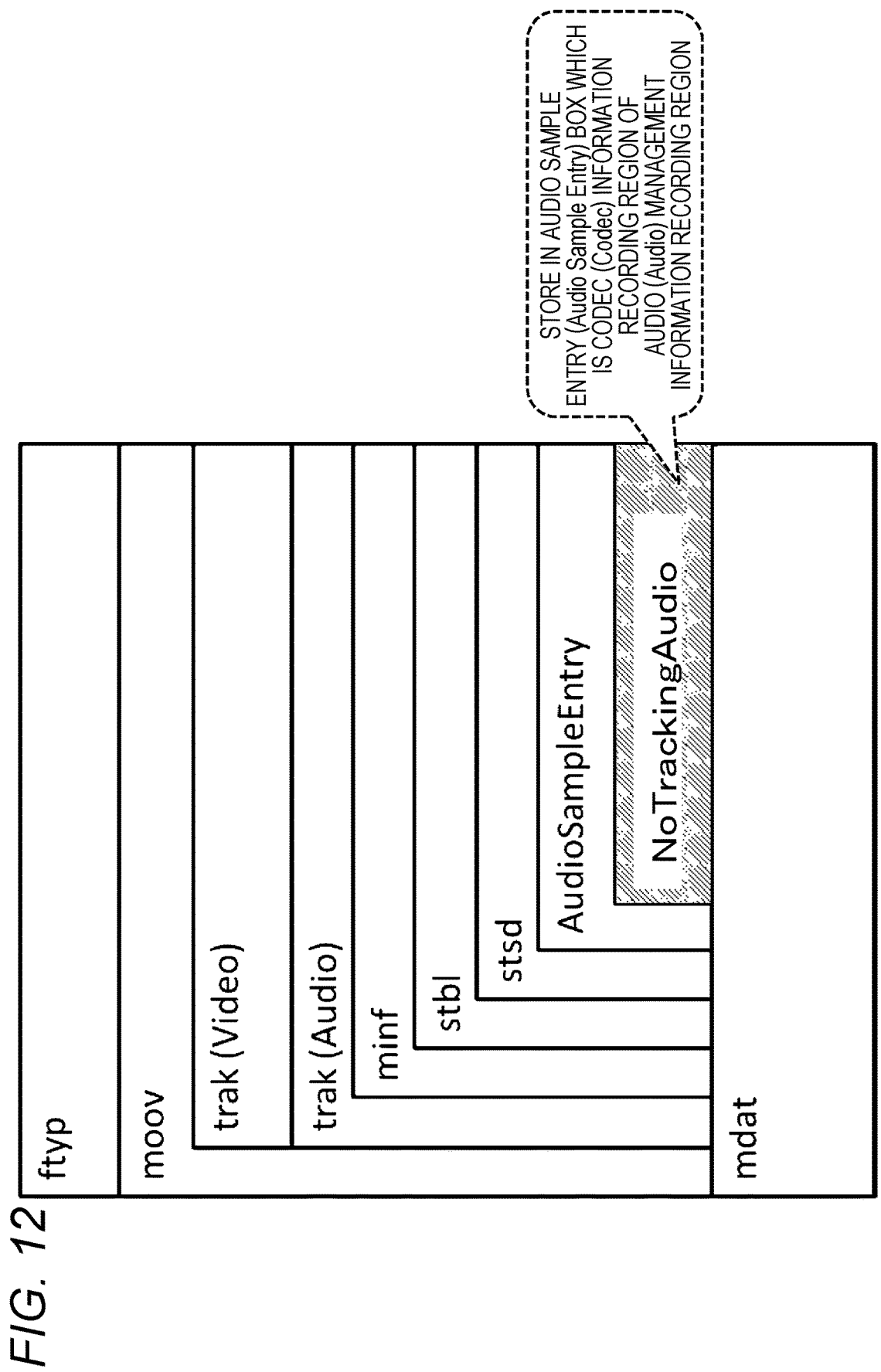
FIG. 12 is a diagram for describing an example of a recording region of audio control information for an MP4 file.

The example illustrated in FIG. 12 is an example in which an audio control information (NoTrackingAudio) record box is set as a lower box in an audio sample entry (AudioSampleEntry) storing codec information and the like in the trak box serving as an audio control information storage box of the MP4 file.

The control information illustrated in FIG. 7 is recorded in the audio control information (NoTrackingAudio) record box illustrated in FIG. 12.

(Second Control Information Storage Example)
The second control information storage example illustrated in FIG. 13 will be described.

Figure 13:
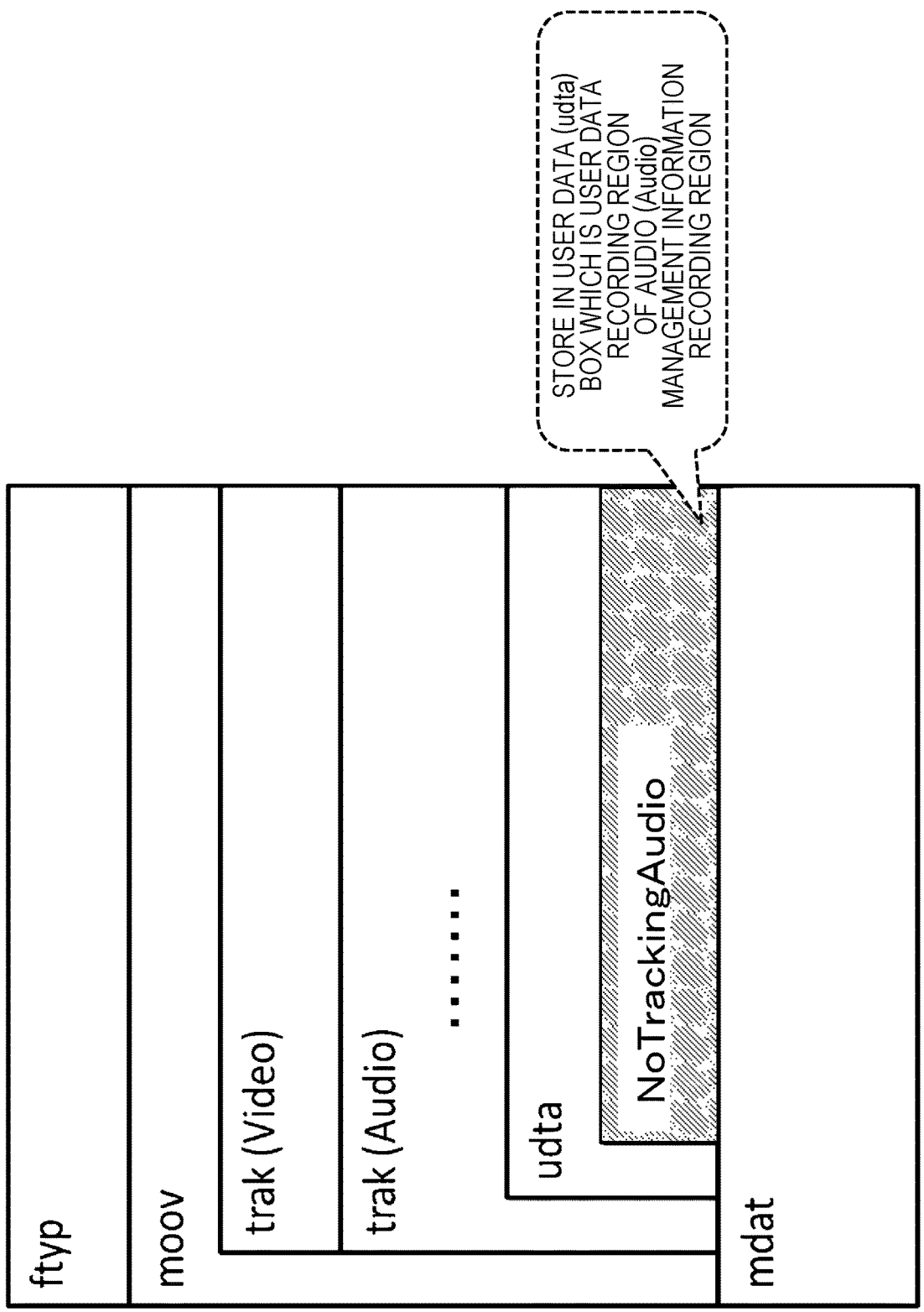
FIG. 13 is a diagram for describing an example of a recording region of audio control information for an MP4 file.

The example illustrated in FIG. 13 is an example in which the audio control information (NoTrackingAudio) record box is set as the lower box in the user data (udta) box storing the user data in the trak box serving as the audio control information storage box of the MP4 file.

The control information illustrated in FIG. 7 is recorded in the audio control information (NoTrackingAudio) record box illustrated in FIG. 12.

It is possible to record the audio control information in the MP4 file 81, for example, in each metadata recording region described with reference to FIGS. 12 and 13.

The following three recording examples will be sequentially described below as the specific control information recording example for the MP4 file:

(First audio control information recording example) the audio control information of a channel unit is recorded in the MP4 file;

(Second audio control information recording example) the audio control information of a stream unit is recorded in the MP4 file; and (Third audio control information recording example) information indicating that the audio control is settable by the user is recorded in the MP4 file.

The respective recording examples will be described below.

[2-1. (First Audio Control Information Recording Example) Recording Example in which Audio Control Information of Channel Unit Recorded in MP4 File]

The 5.1 ch surround audio described above is configured with the following audio elements:

a first audio element=an output channel of a center front speaker (Center Front);

a second audio element=an output channel of a left front speaker (Left Front);

a third audio element=an output channel of a right front speaker (Right Front);

a fourth audio element=an output channel of a left surround speaker (Left Surround);

a fifth audio element=an output channel of a right surround speaker (Right Surround); and a sixth audio element=an output channel of a low frequency effect (LFE) speaker (LFE).

For example, in a case where the 5.1 ch surround audio is used in content such as a current movie, the output channel of the center front speaker (Center Front) is often used for the narration or the like.

In a case where the output channel of the center front speaker (Center Front) is used for narration output in a moving image configured with a celestial sphere image, an omnidirectional image, or a panorama image, it is often desirable that the output channel of the center front speaker (Center Front) be fixed for the narration, and the other channels are controlled such that audios following the display image position be output.

In a case where the audio control information is recorded in the MP4 file, the following parameters can be recorded in the MP4 file:

(1) the all-audio correspondence control information (no_tracking_flags); and (2) the audio element (i) correspondence control information (NoTracking).

As described above with reference to FIG. 8, the correspondence relation between the setting value (flag value) of "(1) the all-audio correspondence control information (no_tracking_flags)" and the audio control form is as follows:

setting value=0: all audios are caused to follow a display image (All channels can be tracked);

setting value=1: all audios are caused not to follow a display image (All channels are not tracked);

setting value=2: a display image following audio and a non-following audio are mixed (Some channels can be tracked); and setting value=4: display image following audio and non-following audio are settable by the user (User selected channels can be tracked).

Further, as described above with reference to FIG. 10, the correspondence relation between the setting value of "(2) the audio element (i) correspondence control information (No-Tracking)" and the audio control form is as follows:

a setting value=0: the audio element (i) is caused to follow the display image (the channel can be tracked); and a setting value=1: the audio element (i) is caused not the follow display image (the channel is not tracked).

Further, the recording order in a case where the audio element (i) correspondence control information (NoTracking) setting value is recorded is specified in advance as described above with reference to FIG. 7.

[2-2. (Second Audio Control Information Recording Example) Example in which Audio Control Information of Stream Unit is Recorded in MP4 File]

Next, an example in which audio control information of a stream unit is recorded in the MP4 file will be described as the second recording example of recording the audio control information in the MP4.

An audio control information recording example for the MP4 file in a case where two audio streams are recorded in the MP4 file will be described as one specific example.

The following two audio streams are assumed to be recorded in the MP4 file:

(1) 5.1 ch surround audio stream; and
(2) ich monaural audio stream.

In a case where the two audio streams are recorded in the MP4 file, the audio control information corresponding to the two audio streams is recorded in the MP4 file.

As an example, the control form has the following settings:

(1) the 5.1 ch surround audio stream is an audio stream configured with audios and the like generated from the subjects in the image and undergoes the image follow type control; and (2) the 1 ch monaural audio stream is an audio stream configured with narration or the like and undergoes the image non-following type control of outputting the audio from a fixed position regardless of the display position.

Further, when an audio is output, two streams of the 5.1 ch and the ich are decoded, synthesized, and output.

In the audio output process, an audio output control unit of the information processing device performs a process of decoding the 5.1 ch surround audio, setting the decoded the 5.1 ch surround audio as an output audio according to a display position, then synthesizing the 5.1 ch surround audio with a decoded stream of the ich monaural audio, and outputting a resulting audio.

[2-3. (Third Audio Control Information Recording Example) Example in which Information Indicating that the Audio Control is Settable by User is Recorded in MP4 File]

Next, an example in which information indicating that the audio control is settable by the user is recorded in the MP4 file will be described as the third audio control information recording example for MP4 file.

In a case where a plurality of controllable audio elements are included in the MP4 file, it is possible to provide a configuration in which the display image following audio and the image display non-following audio are settable by the user in units of audio elements.

As described above with reference to FIG. 8, the correspondence relation between the setting value (flag value) of (1) the all-audio correspondence control information (no_tracking_flags) and the audio control form is as follows:

setting value=0: all audios are caused to follow a display image (All channels can be tracked);

setting value=1: all audios are caused not to follow a display image (All channels are not tracked);

setting value=2: a display image following audio and a non-following audio are mixed (Some channels can be tracked); and setting value=4: display image following audio and non-following audio are settable by the user (User selected channels can be tracked).

In a case where the setting value=4 is recorded in the MP4 file, it indicates that the user is able to set the display image following audio and the display image non-following audio for each of a plurality of audio elements.

For example, the following two audio streams are assumed to be recorded in the MP4 file, similarly to the second audio control information recording example:

(1) 5.1 ch surround audio stream; and
(2) 1 ch monaural audio stream.

In a case where the two audio streams are recorded in the MP4 file, the audio control information corresponding to the two audio streams is recorded in the MP4 file.

Various settings can be performed as a specific recording processing configuration, and one example will be described with reference to FIG. 14.

For example, as illustrated in FIG. 14, first, as the audio control information of the stream unit, control information similar to the setting value (flag value) of the "all-audio correspondence control information (no_tracking_flags)" described above with reference to FIG. 8 is recorded:

setting value=0: all audios are caused to follow a display image (All channels can be tracked);

setting value=1: all audios are caused not to follow a display image (All channels are not tracked);

setting value=2: a display image following audio and a non-following audio are mixed (Some channels can be tracked); and setting value=4: display image following audio and non-following audio are settable by the user (User selected channels can be tracked).

As an example, the control form has the following settings.

The 5.1 ch surround audio stream and the ich monaural audio stream are also assumed to be settable by the user. In this case, the setting value (flag value) of the all-audio correspondence control information (no_tracking_flags) is set to 4 in both cases.

Since the recording process is performed, it is possible to record the control information for the audio element of the stream unit.

Further, in a case where the user setting is performed, the data processing unit of the information processing device performs a process of presenting a user interface (UI) for causing the user to decide the control form to the display unit, and the control form of each audio element is decided in accordance with a user input.

3. Audio Control Process Sequence Using Audio Control Information Recorded in MP4 File Next, an audio control process sequence executed in the information processing device, that is, an audio control process sequence using the audio control information recorded in the MP4 file will be described.

Figure 16:
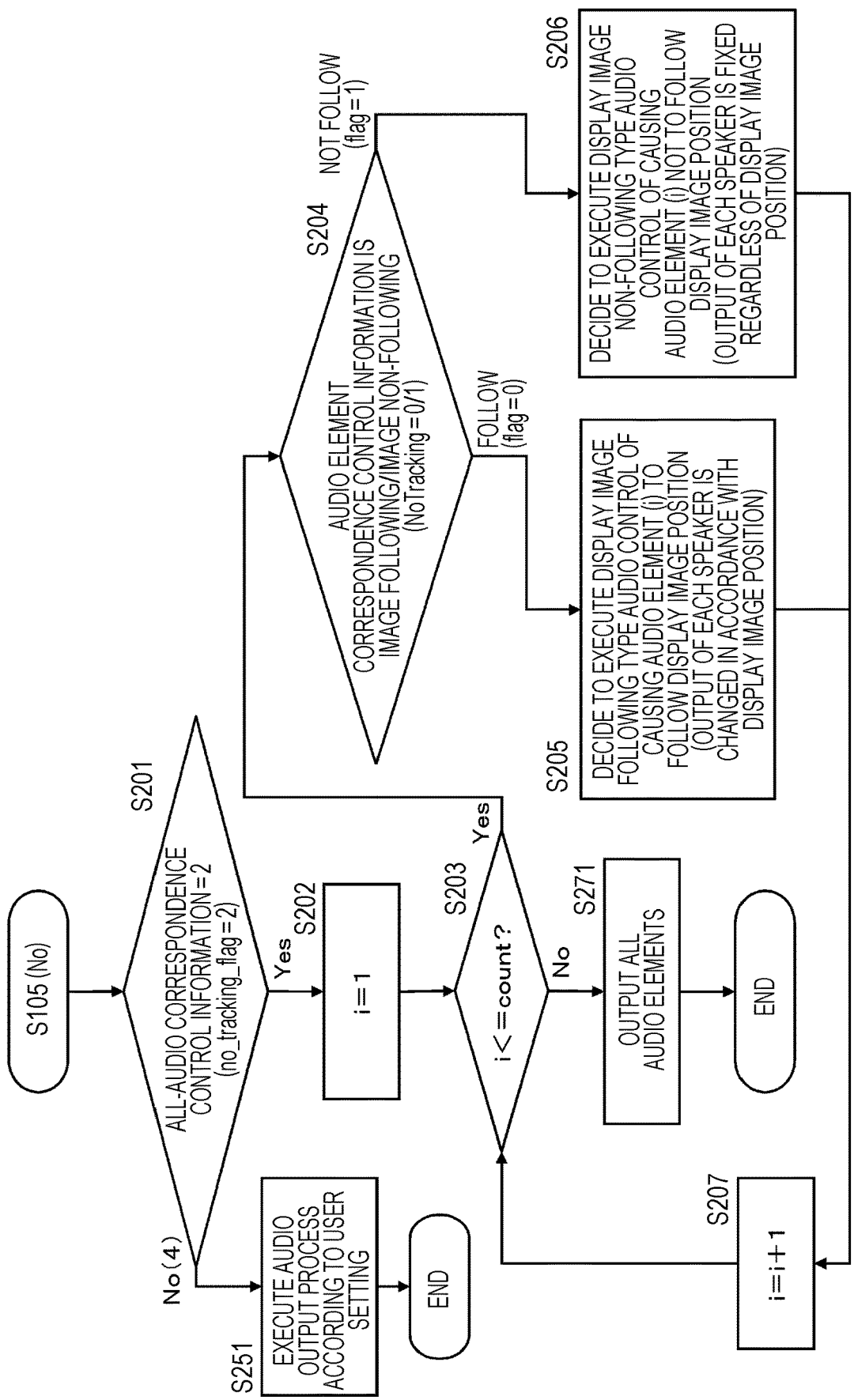
FIG. 16 is a flowchart for describing reading of audio control information from an MP4 file and an execution sequence of an audio control process.

Flowcharts illustrated in FIGS. 15 and 16 are flowcharts for describing the audio control process sequence executed in the information processing device 70 serving as a user device.

The information processing device 70 includes a display unit (display) and an audio output unit (speaker).

The information processing device 70 is, for example, a TV, a PC, a mobile terminal, a head mount display (HMD), or the like.

The information processing device 70 acquires the MP4 file from, for example, the server 50 or the medium 60 illustrated in FIG. 4, and reproduces content recorded in the MP4 file.

The reproduction content is content which includes an image in which images in various directions can be observed such as a celestial sphere image, an omnidirectional image, or a panorama image and further includes audio information to be reproduced together with the image.

Image data and audio data are stored in the MP4 file, and the control information corresponding to the image data and the audio data is also stored in the MP4 file.

The audio control information includes the control information described above with reference to FIG. 7.

A process sequence executed in the information processing device 70 will be described with reference to the flowcharts illustrated in FIGS. 15 and 16.

Further, a process according to the flowcharts illustrated in FIGS. 15 and 16 is executed in the information processing device 70. The information processing device 70 includes a data processing unit equipped with a CPU having a program execution function, and each process is executed under the control of the data processing unit. Further, a hardware configuration example of the information processing device 70 will be described later.

A process of steps of the flow illustrated in FIGS. 15 and 16 will be described.

(Step S101)

In step S101, the data processing unit of the information processing device acquires the MP4 file.

(Step S102)

Then, in step S102, the data processing unit of the information processing device acquires the all-audio correspondence control information (no_tracking_flag) from the acquired MP4 file.

It is a process of acquiring the all-audio correspondence control information (no_tracking_flag) 91 in the control information described above with reference to FIG. 7.

(Step S103)

Next, in step S103, the data processing unit of the information processing device determines whether or not a setting of the all-audio correspondence control information acquired in step S102 is (no_tracking_flag=0), that is, a setting of the "display image following type audio control."

In a case where the setting of the all-audio correspondence control information is (no_tracking_flag=0), that is, the setting of the "display image following type audio control," the process proceeds to step S104.

On the other hand, in a case where the setting of the all-audio correspondence control information is (no_tracking_flag≠0), that is, not the setting of the "display image following type audio control," the process proceeds to step S105.

(Step S104)

In a case where it is determined in step S103 that the setting of the all-audio correspondence control information is (no_tracking_flag=0), that is, the setting of the "display image following type audio control," the data processing unit of the information processing device performs a process of step S104.

In step S104, the data processing unit of the information processing device decides to execute the "display image following type audio control" of causing all the audio elements to follow the display image.

In other words, the audio control of changing the output of each speaker in accordance with the display image position is performed.

(Step S105)

On the other hand, in a case where it is determined in step S103 that the setting of all-audio correspondence control information is (no_tracking_flag≠0), that is, not the setting of the "display image following type audio control," the data processing unit of the information processing device performs a process of step S105.

In step S105, the data processing unit of the information processing device determines whether or not the setting of the all-audio correspondence control information acquired in step S102 is (no_tracking_flag=1), that is, the setting of the "display image non-following type audio control."

In a case where the setting of the all-audio correspondence control information is (no_tracking_flag=1), that is, the setting of the "display image non-following type audio control," the process proceeds to step S106.

On the other hand, in a case where the setting of all-audio correspondence control information is (no_tracking_flag≠1), that is, not the setting of the "display image non-following type audio control," the process proceeds to step S201.

(Step S106)

In a case where it is determined in step S105 that the setting of the all-audio correspondence control information is (no_tracking_flag=1), that is, the setting of the "display image non-following type audio control," the data processing unit of the information processing device performs a process of step S106.

In step S106, the data processing unit of the information processing device decides to execute the "display image non-following type audio control" of causing all the audio elements not to follow the display image.

In other words, the audio output control having a setting so that the output of each speaker is not changed in accordance with the display image position.

(Step S201)

On the other hand, in a case where it is determined in step S105 that the setting of the all-audio correspondence control information is (no_tracking_flag #1), that is, not the setting of the "display image non-following type audio control," the data processing unit of the information processing device performs a process of step S201.

In step S201, the data processing unit of the information processing device determines whether or not the setting of the all-audio correspondence control information acquired in step S102 is (no_tracking_flag=2), that is, whether or not any one of an element serving as a target of the "display image following type audio control" and an element serving as a target of the "display image non-following type audio control" is included in the individual controllable audio element included in the MP4 file.

In a case where the setting of the all-audio correspondence control information is (no_tracking_flag=2), that is, the setting indicating that the audio element serving as the target of the "display image following type audio control" and the audio element serving as the target of the "display image non-following type audio control" are mixed, the process proceeds to step S202.

On the other hand, in a case where the setting of the all-audio correspondence control information is (no_tracking_flag≠2), that is, not the setting indicating that the audio element serving as the target of the "display image following type audio control" and the audio element serving as the target of the "display image non-following type audio control" are mixed, the process proceeds to step S251.

Further, in this case, as understood from FIG. 8, it indicates that the setting of the all-audio correspondence control information is (no_tracking_flag=4), that is, the setting in which it is settable by the user.

(Step S251)

In a case where it is determined in step S201 that the setting of the all-audio correspondence control information is (no_tracking_flag≠2), that is, the setting of the all-audio correspondence control information is (no_tracking_flag=4), the process proceeds to step S251.

In step S251, the data processing unit of the information processing device performs the audio control in accordance with the user setting.

Further, when a user setting process is performed, for example, the data processing unit of the information processing device causes an operation screen (UI) which is settable by the user to be displayed on the display unit to urge the user to input the control form for each audio element.

The data processing unit of the information processing device decides the control form of each audio element in accordance with the user input information and performs the audio control.

(Step S202)

In a case where it is determined in the determination process of step S201 whether or not the setting of the all-audio correspondence control information is (no_tracking_flag=2), that is, the setting indicating that the audio element serving as the target of the "display image following type audio control" and the audio element serving as the target of the "display image non-following type audio control" are mixed, the process proceeds to step S202.

The process of step S202 and subsequent steps is a process in which the recording information of the loop processing portion 92 in the control information illustrated in FIG. 7 is applied.

In other words, the audio element correspondence control information corresponding to each audio element (i) is read, and the control form for each audio element is decided.

First, the process of step S202 is an initial setting of the audio element identifier (i), and i=1 is set.

(Step S203)

In step S203, the data processing unit of the information processing device determines whether or not a value of the audio element identifier (i) is equal to or less than the number of individual controllable audio elements (count) recorded in the processing target MP4 file.

In a case where i>count, it indicates that the process has been completed for all the audio elements, and the process proceeds to step S271.

In a case where i≥count, it indicates that there is an unprocessed audio element, and the process proceeds to step S204.

(Step S204)

In a case where it is determined in step S203 that the audio element identifier=i≤count, the process of step S204 is performed.

In step S204, the data processing unit of the information processing device acquires the setting value of the audio element (i) correspondence control information (NoTracking) corresponding to the audio element identifier (i) from the loop processing portion 92 of the control information illustrated in FIG. 7.

Further, it is determined whether the setting value of the acquired audio element (i) correspondence control information (NoTracking) is the setting value=0, that is, it is the setting of the "display image following type audio control," or the setting value=1, that is, it is the setting of the "display image non-following type audio control."

In a case where the setting value=0, that is, it is the setting of the "display image following type audio control," the process proceeds to step S205.

On the other hand, in a case where the setting value=1, that is, it is the setting of the "display image non-following type audio control," the process proceeds to step S206.

(Step S205)

In a case where it is determined in step S204 that the setting value of the audio element (i) correspondence control information (NoTracking) corresponding to the audio element (i) is the setting value=0, that is, the setting of the "display image following type audio control," the process proceeds to step S205.

In step S205, the data processing unit of the information processing device decides to execute the control of the audio element element (i) of the processing target as the "display image following type audio control" of causing the audio to follow the display image.

In other words, the audio control of changing the output of each speaker in accordance with the display image position is performed.

(Step S206)

On the other hand, in a case where it is determined in step S204 that the setting value of the audio element (i) correspondence control information (NoTracking) corresponding to the audio element (i) is the setting value=1, that is, the setting of the "display image non-following type audio control," the process proceeds to step S206.

In step S206, the data processing unit of the information processing device decides to execute the control of the audio element element (i) of the processing target as the "display image non-following type audio control" of causing the audio not to follow the display image.

In other words, the audio output control having a setting so that the output of each speaker is not changed in accordance with the display image position is performed.

(Step S207)

After a processing form of one audio element (i) is decided in step S205 or step S206, in step S207, a process of updating the audio element identifier (i) is performed. In other words, i=i+1 is set, and the process proceeds to step S203. After the processing form for all the audio elements stored in the MP4 file is decided, No is determined in the determination process of step S203, and the process proceeds to step S271.

(Step S271)

In step S271, the data processing unit of the information processing device outputs all the audio elements stored in the MP4 file in accordance with the decided control form.

Through the processes, the audio output control is performed in units of audio elements in any one of the following forms:

the "display image following type control;" and the "display image non-following type control."

4. (Second Embodiment) Embodiment in which Audio Control Information is Recorded in MPD Next, an embodiment in which the audio control information is recorded in the MPD will be described as a second embodiment.

Figure 17:
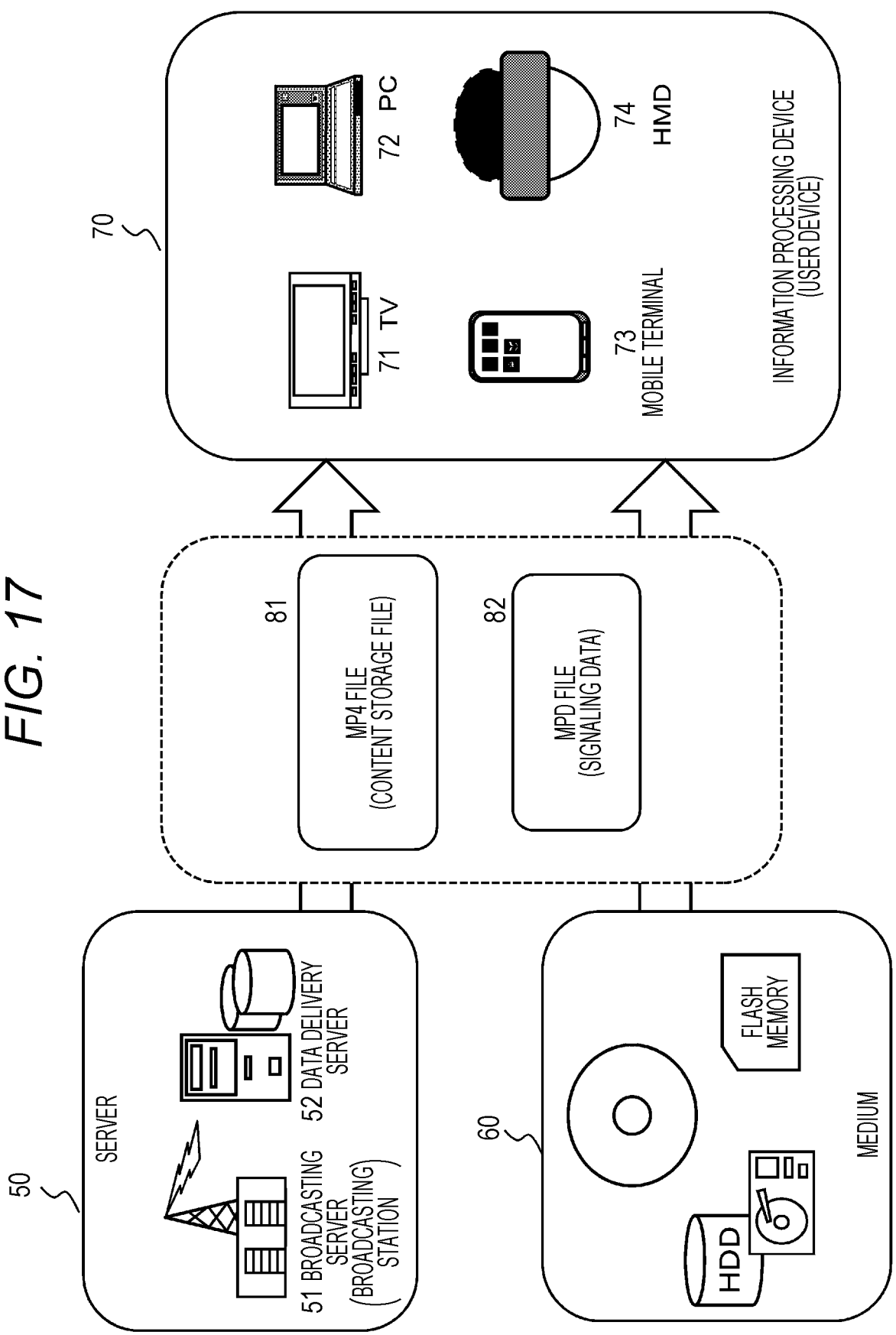
FIG. 17 is a diagram for describing a data provision process configuration for an information processing device.

FIG. 17 is a diagram illustrating an information processing device 70 which executes the audio control of the present disclosure according to the second embodiment, a server 50 which provides content including image data and audio data to the information processing device 70, and a medium 60.

For example, image data such as a celestial sphere image, an omnidirectional image, or a panorama image and audio data are transmitted from the server 50 illustrated in FIG. 4 or read from the medium 60 and provided to the information processing device 70.

The server 50 includes, for example, a broadcasting server 51 such as a broadcasting station and other data providing servers 52, and various data is transmitted to the information processing device 70 via a broadcast wave or a network such as the Internet.

The information processing device 70 receives and reproduces transmission data transmitted from the server 50 via a broadcast wave or a network such as the Internet.

The medium 60 includes various media such as a disk, a flash memory, a hard disk, and the like, which are loaded into the information processing device.

The information processing device 70 reads and reproduces the recording data of the media.

An information processing device which performs content reproduction is, for example, a TV 71, a PC 72, a mobile terminal 73, a head mount display (HMD) 74, or the like and includes an image display unit and an audio output unit (speaker).

The content provided from the server 50 or the medium 60 to the information processing device 70 is content including image data in which images in various directions can be selectively displayed such as a celestial sphere image, an omnidirectional image, or a panorama image and audio data.

The content is stored, for example, in the MP4 file 81 and provided, similarly to the first embodiment described above.

In the first embodiment described above, for example, the audio control information described above with reference to FIG. 7 is recorded in the trak box serving as the metadata storage region of the MP4 file.

In the present second embodiment, audio control information related to audio data stored in an MP4 file 81 illustrated in FIG. 17 is stored in an MPD file 82 separate from the MP4 file 81 and provided to the information processing device 70.

The MPD file 82 is one manifest file constituting signaling data (metadata) specified in an MPEG-DASH standard which is a standard related to streaming delivery content.

The MPD file 82 is a manifest file for describing metadata which is management information of a moving image or an audio file.

The present second embodiment is an embodiment in which the audio control information related to the audio data stored in the MP4 file 81 is recorded in the MPD file 82.

For example, various control data can be stored in the MPD file 82 in units of periods which are time intervals obtained by subdividing a reproduction period of time of certain content.

A configuration example of the MPD file will be described with reference to FIGS. 18 and 19.

Figure 18:
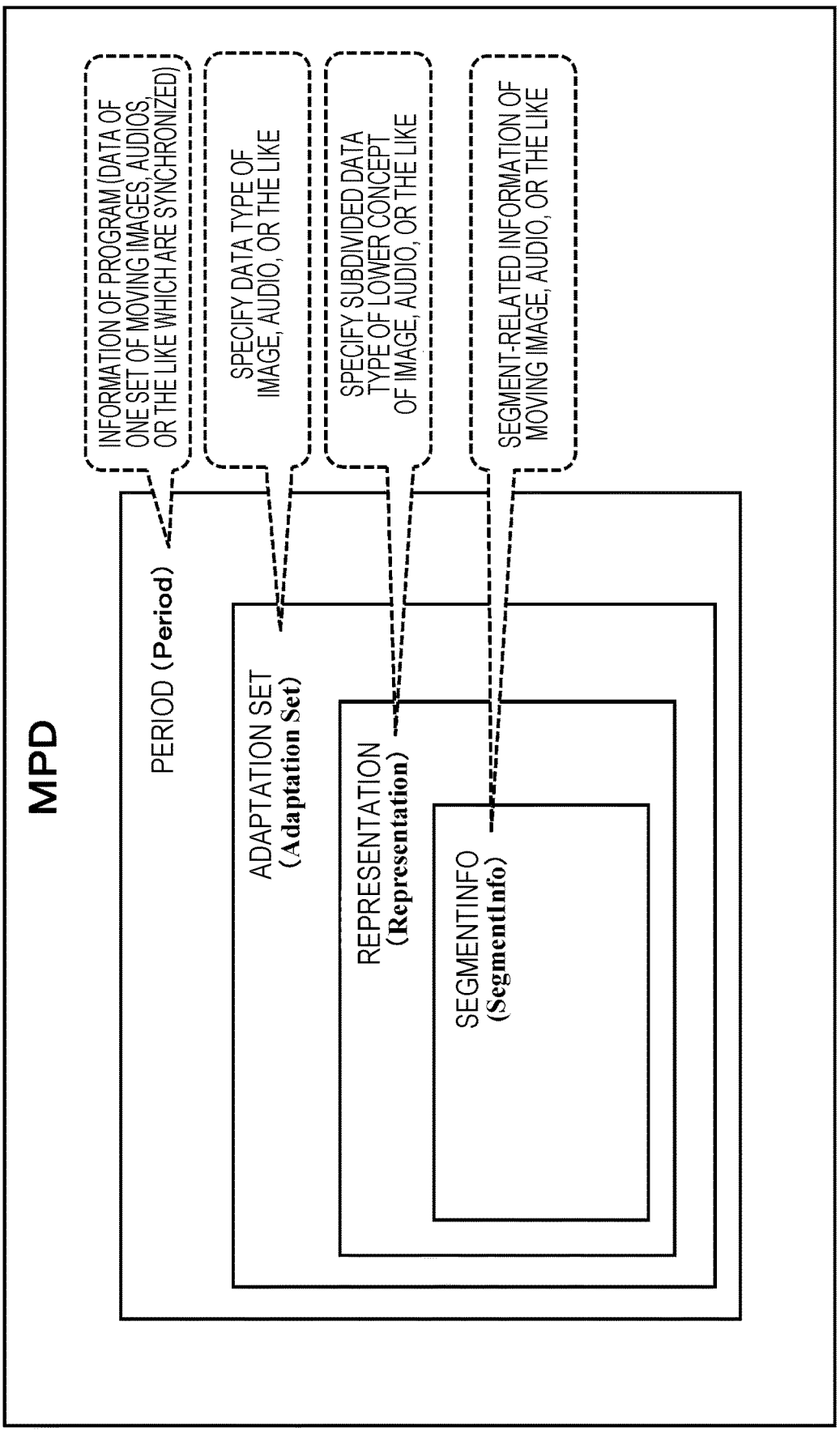
FIG. 18 is a diagram for describing an MPD file.

FIG. 18 is a diagram illustrating an example of an MPD format.

Information such as attributes or control information can be described in an MPD in units of various specified ranges to be described below for each stream of an image or audio as illustrated in FIG. 18:
 (1) Period defining an interval on a time axis;
 (2) AdaptationSet specifying a data type or the like of an image, an audio, or the like;
 (3) Representation specifying subdivided lower data type of an image, an audio, or the like; and
 (4) SegmentInfo serving as information recording region of a segment (AV segment) unit of an image or an audio.

Figure 19:
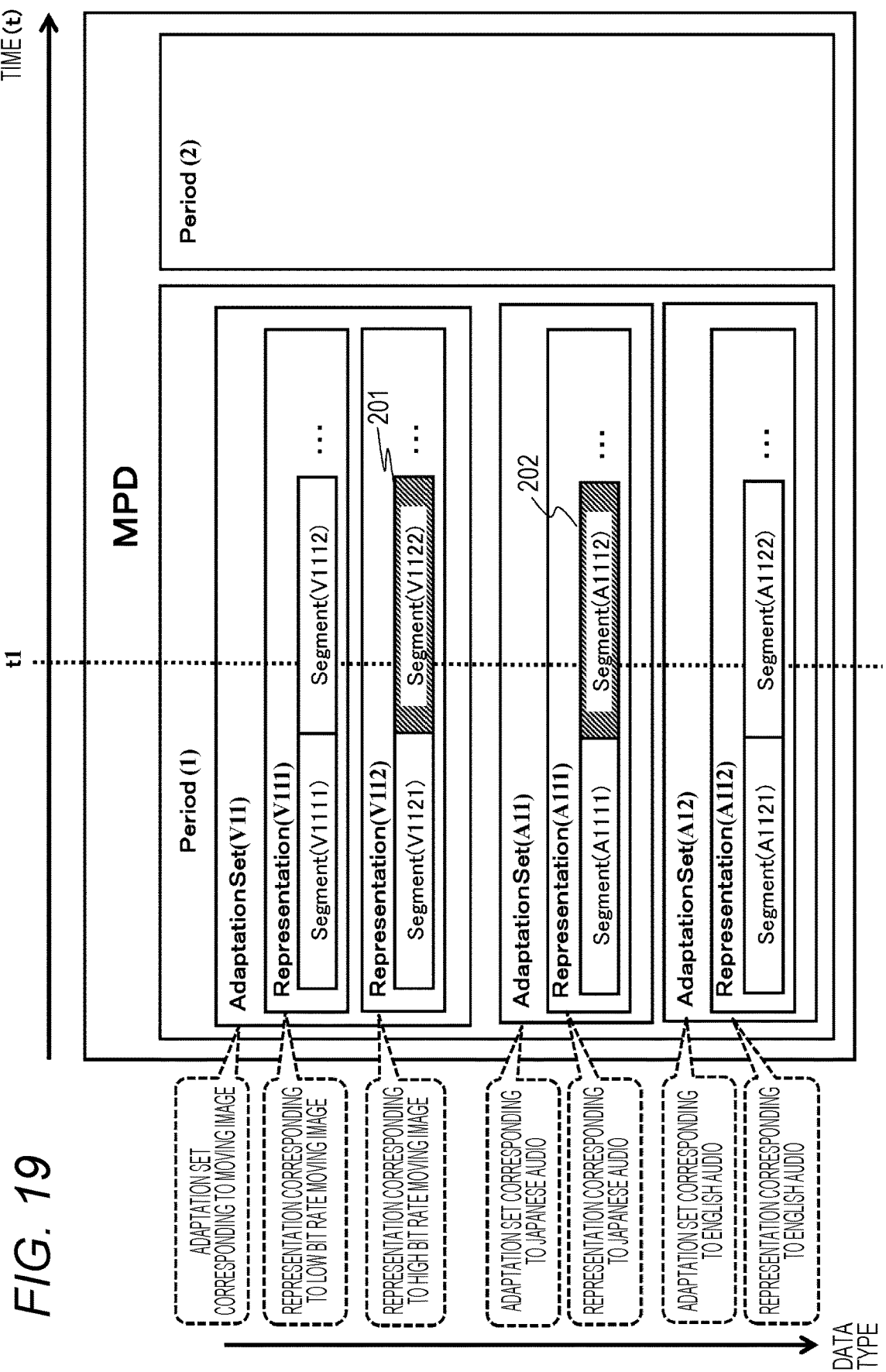
FIG. 19 is a diagram for describing an MPD file.

FIG. 19 is a diagram illustrating information (control information, management information, attribute information, and the like) corresponding to an AV segment recorded in the MPD which is developed in a chronological order.

A time is assumed to pass from left to right. For example, the time axis corresponds to the reproduction period of time of AV content in the information processing device.

Various pieces of information corresponding to the AV segment are recorded in the MPD. Further, for example, in a case where the MPD file 82 is provided from the server 50 to the information processing device 70, the MPD is transmitted as the signaling data ahead of the MP4 file 81 storing the AV segment which is actual target data.

The information processing device 70 is able to analyze the MPD, acquire access information or codec information of the MP4 file 81 storing the AV segment which is actual reproduction target data, and prepare for reproduction of the AV segment stored in the MP4 file 81.

As described above with reference to FIG. 18, the MPD is configured to record metadata (signaling data) such as the attribute information and the control information related to the AV segment under the following hierarchical settings:
 (1) Period;
 (2) Adaptation Set;
 (3) Representation; and
 (4) SegmentInfo.

FIG. 19 is a diagram illustrating the metadata recording regions which is developed on a time axis in accordance with a data type.

FIG. 19 illustrates two periods of a period 1 (Period (1)) and a period 2 (Period (2) and further illustrates three adaptation sets (AdaptationSet) under the period 1 (Period (1)):
 (V11) An adaptation set V11 (Adaptation (V11)) which is an image correspondence information recording region;
 (A11) An adaptation set A11 (Adaptation (A11)) which is a Japanese audio correspondence information recording region; and
 (A12) An adaptation set A12 (Adaptation (A12)) which is an English audio correspondence information recording region.

(V11) An adaptation set V11 (Adaptation (V11)) which is the image correspondence information recording region has the following two Representations as information recording regions of stream units having different attributes:
 (V111) A Representation (V111) (Representation (V111)) which is a low bit rate image correspondence information recording region; and
 (V112) A Representation (V112) (Representation (V112)) which is a high bit rate image correspondence information recording region.

Similarly, (A11) the adaptation set A11 (Adaptation (A11)) which is the Japanese audio image correspondence information recording region has the following Representation:
 (A111) A Representation (A111) (Representation (A111)) which is a Japanese audio correspondence information recording region.

Similarly, (A12) the adaptation set A12 (Adaptation (A12)) which is the English audio image correspondence information recording region has the following Representation.
 (A121) A Representation (A121) (Representation (A121)) which is an English audio correspondence information recording region.

Further, each Representation has a configuration in which information can be recorded in units of segments.

For example, the information processing device (client) which selects and reproduces a high bit rate image and a Japanese audio at a time t1 selects information related to the high bit rate image and the Japanese audio as a reproduction target and acquires the information from the MPD.

The recording information of the MPD serving as the selection target is the information of segment regions 201 and 202 illustrated in FIG. 19.

As described above, a receiving device selects information corresponding to data (segment) to be set as a reproduction target in the receiving device from the MPD transmitted from a transmitting device as signaling data and refers only to the selected information.

As described above, a data type and segment correspondence information of a time unit can be recorded in the MPD.

In the second embodiment to be described below, image and audio data (AV segment) which is reproduction target data are stored in the MP4 file 81 illustrated in FIG. 17, and control information related to the image and audio data (AV segment) stored in the MP4 file 81 is stored in the MPD file 82.

In a case where the audio control information is recorded in the MPD file 82 illustrated in FIG. 17, information indicating various control forms can be recorded, similarly to the MP4 file described above.

FIG. 20 illustrates a correspondence relation between the control form indicated by the audio control information recorded in the MPD file 82 and the control form indicated by the setting value of "(1) the all-audio correspondence control information (no_tracking_flags)" recorded in the MP4 file.

In the MPD, a new descriptor (Descriptor) for recording the audio control information is set in a role element (Role Element). For example, as illustrated in FIG. 20, URI=http://foo.bar/scheme/AudioNoTracking is set as a new descriptor for recording the audio control information.

As illustrated in FIG. 20, the audio control information which can be set in the audio control information recording region of this MPD has the following three types:

(a) NoTracking;
(b) Numerical value character string; and
(c) USER

Further, as illustrated in FIG. 20, the setting values of the types (a) to (c) correspond to the setting values 1, 2, and 4 of "(1) the all-audio correspondence control information (no_tracking_flags)" recorded in the MP4 file described above.

In other words, it has the following correspondence relation as illustrated in FIG. 20.

(a) NoTracking corresponds to the setting value=1 of "(1) the all-audio correspondence control information (no_tracking_flags)" of the MP4 file and indicates the control process of causing all audios not to follow the display image (All channels are not tracked).

(b) Numerical value character string corresponds to the setting value=2 of "(1) the all-audio correspondence control information (no_tracking_flags)" of the MP4 file and indicates that the display image following audio and the display image non-following audio are mixed (Some channels can be tracked).

(c) USER corresponds to the setting value=4 of "(1) the all-audio correspondence control information (no_tracking_flags)" of the MP4 file and indicates that the display image following audio and the display image non-following audio are settable by the user (User selected channels can be tracked).

Hereinafter, the following three recording examples will be sequentially described as specific control information recording examples in a case where the audio control information is recorded in the MPD file 82 illustrated in FIG. 17:

(first audio control information recording example) the audio control information of the channel unit is recorded in the MPD file;

(second audio control information recording example) the audio control information of the stream unit is recorded in the MPD file; and (third audio control information recording example) the information indicating that the audio control is settable by the user is recorded in the MPD file.

The respective recording examples will be described below.

[4-1. (First Audio Control Information Recording Example) Recording Example in which Audio Control Information of Channel Unit is Recorded in MPD File]

The 5.1 ch surround audio described above is configured with the following audio elements:

a first audio element=an output channel of a center front speaker (Center Front);

a second audio element=an output channel of a left front speaker (Left Front);

a third audio element=an output channel of a right front speaker (Right Front);

a fourth audio element=an output channel of a left surround speaker (Left Surround);

a fifth audio element=an output channel of a right surround speaker (Right Surround); and a sixth audio element=an output channel of a low frequency effect (LFE) speaker (LFE).

For example, in a case where the 5.1 ch surround audio is used in content such as a current movie, the output channel of the center front speaker (Center Front) is often used for the narration or the like.

In a case where the output channel of the center front speaker (Center Front) is used for narration output in a moving image configured with a celestial sphere image, an omnidirectional image, or a panorama image, it is often desirable that the output channel of the center front speaker (Center Front) be fixed for the narration, and the other channels are controlled such that audios following the display image position be output.

An example of the audio control information in a case where the audio control information of the channel unit is recorded in the MPD file is shown below as illustrated in FIG. 21.

```
<MPD>
    <Period>
        <AdaptationSet mime-type="video/mp4">
            <Representation>
                <BaseURL>
http://foo.bar/video.mp4</BaseURL>
            </Representation>
        </AdaptationSet>

...
        <!-- Audio in which only Center Channel of 5.1ch
is not tracked -->
        <AdaptationSet mime-type="audio/mp4">
            <AudioChannelConfiguration
schemeUri="urn:mpeg:dash:23003:3:audio_channel_configuration
:2011" value="6">
                <Role
schemeIdUri="http://foo.bar/scheme/AudioNoTracking"
value="100000">
```

```
        <Representation>
            <BaseURL>
http://foo.bar/audio.mp4</BaseURL>
        </Representation>
    </AdaptationSet>
    ...
    </Period>
</MPD>
```

As illustrated in FIG. 21, control information recording region 251 is included in the MPD description.

The control information recording region 251 is a region storing control information in which one audio element (Center Channel) of the 5.1 ch stream is set to the "display image non-following type control."

As described above, in MPD, a new descriptor (Descriptor) for recording the audio control information is set in the role element (Role Element). In the above example, URI=http://foo.bar/scheme/AudioNoTracking is used.

In the example illustrated in FIG. 21, a value described in the role element is

"100000."

As described above with reference to FIG. 20, this value corresponds to the setting value=2 of "(1) the all-audio correspondence control information (no_tracking_flags)" of the MP4 file and indicates that the display image following audio and the display image non-audio information are mixed (Some channels can be tracked).

In other words, the control information recording region 251 records a control information setting value (100000) in which only one audio element (Center Channel) of the 5.1 ch stream is set to the "display image non-following type control," and the other audio elements are set to the "display image following type control."

The numerical value character string indicates that the following audio control processes are executed:

the first audio element [center front speaker]=image non-following;

the second audio element [left front speaker]=image following;

the third audio element [right front speaker]=image following;

the fourth audio element [left surround speaker]=image following;

the fifth audio element [right surround speaker]=image following; and the sixth audio element [low frequency effect speaker (low frequency enhancement)]=image following speaker.

[4-2. (Second Audio Control Information Recording Example) Example in which Audio Control Information of Stream Unit is Recorded in MPD File]

Next, an example in which the audio control information of the stream unit is recorded in the MPD file will be described as the second recording example of recording the audio control information in the MPD.

As one specific example, an example in which the audio control information of the stream unit is recorded in a case where an audio stream of 1ch is recorded in the MP4 file is shown below as illustrated in FIG. 22.

```
<MPD>
    <Period>
        <AdaptationSet mime-type="video/mp4">
            <Representation>
                <BaseURL>
```

```
http://foo.bar/video.mp4</BaseURL>
            </Representation>
        </AdaptationSet>
        ...
        <!--Audio in which stream of 1ch is not tracked-->
        <AdaptationSet mime-type="audio/mp4">
            <AudioChannelConfiguration
schemeUri="urn:mpeg:dash:23003:3:audio_channel_configuration
:2011" value="1">
                <Role
schemeIdUri="http://foo.bar/scheme/AudioNoTracking"
value="NoTracking">
                    <Representation>
                        <BaseURL>
http://foo.bar/audio1.mp4</BaseURL>
                    </Representation>
            </AdaptationSet>
        ...
    </Period>
</MPD>
```

As illustrated in FIG. 22, a control information recording region 252 is included in the MPD description.

The control information recording region 252 is a recording region of control information in which one audio element of one channel stream is set to the "display image non-following type control."

As described above, in MPD, a new descriptor (Descriptor) for recording the audio control information is set in the role element (Role Element). In the above example, URI=http://foo.bar/scheme/AudioNoTracking is used.

In the example illustrated in FIG. 22, a value described in the role element is "NoTracking."

As described above with reference to FIG. 20, the value corresponds to the setting value=1 of "(1) the all-audio correspondence control information (no_tracking_flags)" of the MP4 file, that is, the control information setting value for executing the process of causing all audios not to follow the display image (All channels are not tracked).

[4-3. (Third Audio Control Information Recording Example) Example in which Information Indicating that Audio Control is Settable by User is Recorded in MPD File]

Next, an example in which the information indicating that the audio control is settable by the user is recorded in the MPD file will be described as the third audio control information recording example for the MPD file.

Similarly to the first embodiment described above, in this second embodiment, in a case where a plurality of controllable audio elements are included, the user is able to set the display image following audio and the display image non-following audio in units of audio elements.

An example of the audio control information in a case where the audio control information indicating that the display image following audio and the display image non-following audio are settable by the user in units of audio elements is recorded in the MPD file is shown below as illustrated in FIG. 23.

```
<MPD>
    <Period>
        <AdaptationSet mime-type="video/mp4">
            <Representation>
                <BaseURL>
http://foo.bar/video.mp4</BaseURL>
            </Representation>
        </AdaptationSet>
        ...
        <!--Audio in which only Center Channel of 2ch is
```

-continued

```
not tracked -->
        <AdaptationSet mime-type="audio/mp4">
            <AudioChannelConfiguration
schemeUri="urn:mpeg:dash:23003:3:audio_channel_configuration
:2011" value="2">
            <Role
schemeIdUri="http://foo.bar/scheme/AudioNoTracking"
value="USER">
            <Representation>
                <BaseURL>
http;//foo.bar/audio.mp4</BaseURL>
            </Representation>
        </AdaptationSet>
    ...
    </Period>
</MPD>
```

As illustrated in FIG. 23, a control information recording region 253 is included in the MPD description.

The audio control information indicating that the display image following audio and the display image non-following audio are settable by the user in units of audio elements is recorded in the control information recording region 253.

As described above, in MPD, a new descriptor (Descriptor) for recording the audio control information is set in the role element (Role Element). In the above example, URI=http://foo.bar/scheme/AudioNoTracking is used.

In the example illustrated in FIG. 23, a value described in the role element is
"USER."

As described above with reference to FIG. 20, this value corresponds to the setting value=4 of "(1) the all-audio correspondence control information (no_tracking_flags)" of the MP4 file, that is, an audio control information setting value indicating that the display image following audio and the display image non-following audio are settable by the user in units of audio elements.

5. Audio Control Process Sequence Using Audio Control Information Recorded in MPD File Next, an audio control process sequence executed in the information processing device, that is, an audio control process sequence using the audio control information recorded in the MPD file will be described.

Flowcharts illustrated in FIGS. 24 and 25 are flowcharts for describing the audio control process sequence executed in the information processing device 70 serving as a user device.

The information processing device 70 includes a display unit (display) and an audio output unit (speaker).

The information processing device 70 is, for example, a TV, a PC, a mobile terminal, a head mount display (HMD), or the like.

The information processing device 70 acquires the MPD file from, for example, the server 50 or the medium 60 illustrated in FIG. 4, and reproduces content recorded in the MPD file.

The reproduction content is content which includes an image in which images in various directions can be observed such as a celestial sphere image, an omnidirectional image, or a panorama image and further includes audio information to be reproduced together with the image.

Image data and audio data are stored in the MP4 file, and the control information corresponding to the image data and the audio data is also stored in the MPD file.

A process sequence executed in the information processing device 70 will be described with reference to the flowcharts illustrated in FIGS. 24 and 25.

Further, a process according to the flowcharts illustrated in FIGS. 24 and 25 is executed in the information processing device 70. The information processing device 70 includes a data processing unit equipped with a CPU having a program execution function, and each process is executed under the control of the data processing unit. Further, a hardware configuration example of the information processing device 70 will be described later.

A process of steps of the flow illustrated in FIGS. 24 and 25 will be described.

(Step S301)
In step S301, the data processing unit of the information processing device acquires the MPD file.

(Step S302)
Then, in step S302, the data processing unit of the information processing device determines whether or not there is the following role element, that is, the role element in which the following audio control information is recorded in the acquired MPD file:
<Role schemeIdUri=http://foo.bar/scheme/AudioNoTracking>

In a case where there is a role element in which the audio control information is recorded, the process proceeds to step S304, and otherwise, the process proceeds to step S303.

(Step S303)
In a case where it is determined that there is no role element in which the audio control information is recorded in the adaptation set of the MPD file, the data processing unit of the information processing device performs a process of step S303.

In step S303, the data processing unit of the information processing device decides to execute the "display image following type audio control" of causing all audio elements to follow the display image.

In other words, the audio control of changing the output of each speaker in accordance with the display image position is performed.

(Step S304)
On the other hand, in a case where it is determined in step S303 that there is a role element in which the audio control information is recorded in the adaptation set of the MPD file, a process of step S304 is performed.

In step S304, the data processing unit of the information processing device determines whether or not a value of the audio control information recorded in the adaptation set of the MPD file acquired in step S302 is
"NoTracking."

In a case where "NoTracking" is recorded, the process proceeds to step S305.

Otherwise, the process proceeds to step S401.

(Step S305)
In a case where it is determined in step S304 that the value of the audio control information recorded in the adaptation set of the MPD file is
"NoTracking,"
the data processing unit of the information processing device performs a process of step S305.

In step S305, the data processing unit of the information processing device decides to execute the "display image non-following type audio control" of causing all audio elements not to follow the display image.

In other words, the audio output control having a setting so that the output of each speaker is not changed in accordance with the display image position is performed.

(Step S401)

On the other hand, in a case where it is determined in step S304 that the value of the audio control information recorded in the adaptation set of the MPD file is not
"NoTracking,"
the data processing unit of the information processing device performs a process of step S401.

In step S401, the data processing unit of the information processing device determines whether or not the value of the audio control information recorded in the adaptation set of the MPD file acquired in step S302 is
"USER."

In a case where the value of the audio control information recorded in the adaptation set of the MPD file is
"USER,"
the process proceeds to step S451.

On the other hand, in a case where the value of the audio control information recorded in the adaptation set of the MPD file is not
"USER,"
the process proceeds to step S402.

(Step S451)

In a case where it is determined in step S401 that the value of audio control information recorded in the adaptation set of the MPD file is "USER," the process proceeds to step S451.

In step S451, the data processing unit of the information processing device executes the audio control according to the user setting.

Further, when a user setting process is performed, for example, the data processing unit of the information processing device causes an operation screen (UI) which is settable by the user to be displayed on the display unit to urge the user to input the control form for each audio element.

The data processing unit of the information processing device decides the control form of each audio element in accordance with the user input information and performs the audio control.

(Step S402)

In a case where it is determined in the determination process of step S401 that the value of the audio control information recorded in the adaptation set of the MPD file is not "USER," that is, the setting indicating that the audio element serving as the target of the "display image following type audio control" and the audio element serving as the target of the "display image non-following type audio control" are mixed, the process proceeds to step S402.

The process of step S402 and subsequent steps is a process of reading the audio element correspondence control information corresponding to each audio element (i) and deciding the control form for each audio element.

The process of step S402 is a process of reading the control information bit string corresponding to each audio element from the head.

For example, in a case where it has six audio elements of six channels constituting a 5.1 ch surround audio, a bit string is, for example, [100000].

(Step S403)

In step S403, it is determined whether or not there is unprocessed data of the audio control information bit string, and in a case where there is unprocessed data, a process of step S404 and subsequent steps based on bit values sequentially read from the head is performed.

(Step S404)

In step S404, the data processing unit of the information processing device performs a process based on the bit values sequentially read from the control information bit string corresponding to each audio element.

Further, it is determined whether the setting value (bit value) corresponding to the acquired audio element (i) is
the setting value=0, that is, the setting of the "display image following type audio control," or
the setting value=1, that is, the setting of the "display image non-following type audio control."

In a case where the setting value (bit value) corresponding to the acquired audio element (i) is the setting value=0, that is, the setting of the "display image following type audio control," the process proceeds to step S405.

On the other hand, in a case where the setting value (bit value) corresponding to the acquired audio element (i) is the setting value=1, that is, the setting of the "display image non-following type audio control," the process proceeds to step S406.

(Step S405)

In a case where it is determined in step S404 that the
setting value of the audio element (i) correspondence control information (NoTracking) corresponding to the audio element (i) is
the setting value=0, that is, the setting of the "display image following type audio control," the process proceeds to step S405.

In step S405, the data processing unit of the information processing device decides to execute the control of the audio element element (i) of the processing target as the "display image following type audio control" of causing the audio to follow the display image.

In other words, the audio control of changing the output of each speaker in accordance with the display image position is performed.

If the process of step S405 is completed, the process returns to step S403, and the process based on a setting value (bit value) corresponding to a next audio element is performed.

(Step S406)

On the other hand, in a case where it is determined in step S404 that the setting value of the audio element (i) correspondence control information (NoTracking) corresponding to the audio element (i) is
the setting value=1, that is, the setting of the "display image non-following type audio control," the process proceeds to step S406.

In step S406, the data processing unit of the information processing device decides to execute the control of the audio element element (i) of the processing target as the "display image non-following type audio control" of causing the audio not to follow the display image.

In other words, the audio output control having a setting so that the output of each speaker is not changed in accordance with the display image position is performed.

If the process of step S406 is completed, the process returns to step S403, and the process based on a setting value (bit value) corresponding to a next audio element is performed.

(Step S471)

In a case where it is determined in step S403 that there is no unprocessed element, the data processing unit of the information processing device causes the process to proceed to step S471.

In step S471, the data processing unit of the information processing device outputs all the audio elements stored in the MPD file in accordance with the decided control form.

Through the processes, the audio output control is performed in units of audio elements in anyone of the following forms:

the "display image following type control;" and
the "display image non-following type control."

6. Hardware Configuration Example of Information Processing Device

Next, hardware configuration examples of the information processing device and the server which perform the processes according to the embodiment will be described with reference to FIG. 26.

Figure 26:
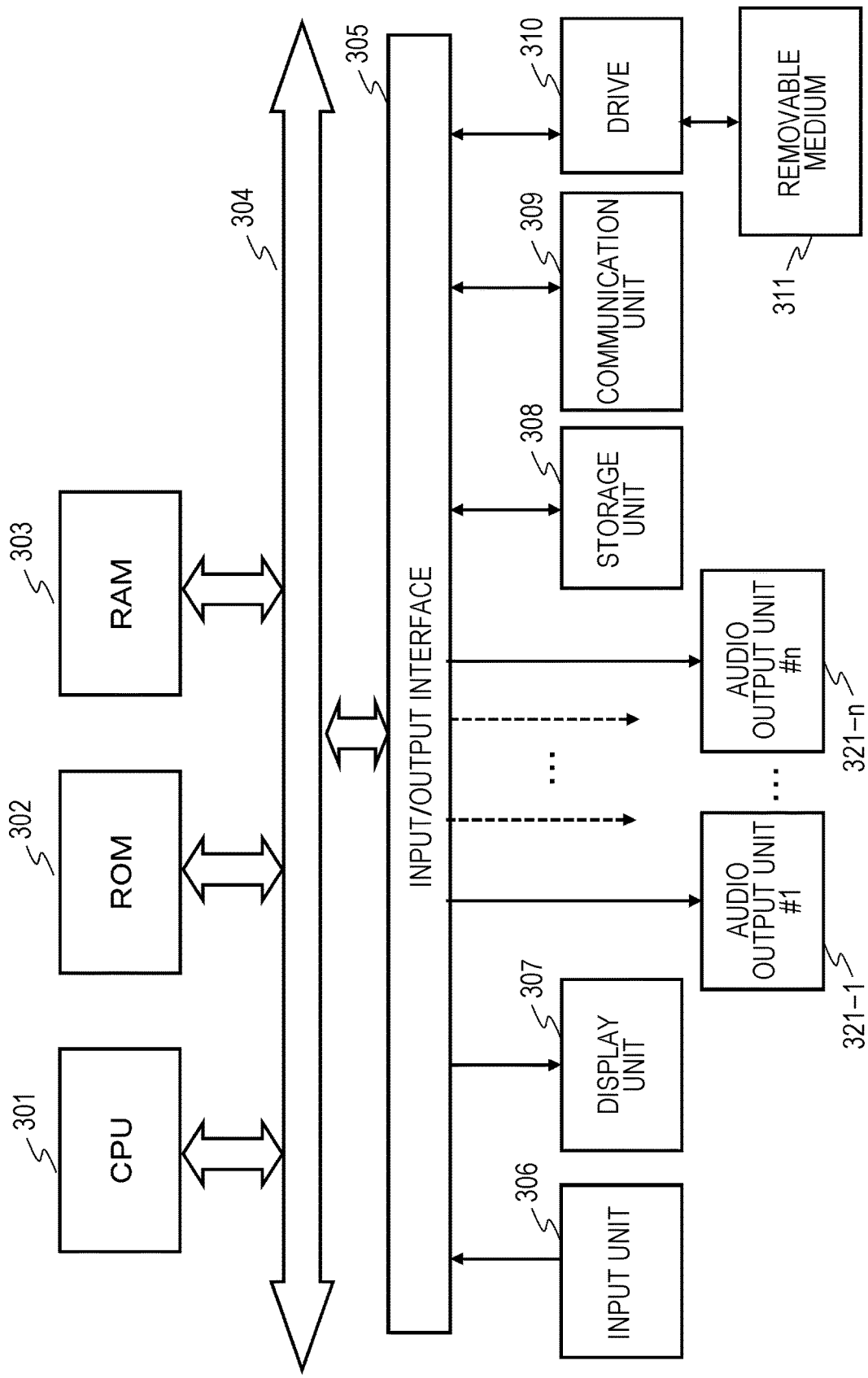
FIG. 26 is a diagram illustrating a hardware configuration example of an information processing device.

Hardware illustrated in FIG. 26 is an example of a hardware configuration of the information processing device (the user device) 70 illustrated in FIGS. 4 and 17, that is, the information processing device (the user device) 70 which executes the image reproduction and the audio output.

Further, hardware illustrated in FIG. 26 is an example of a hardware configuration of the server 50 illustrated in FIGS. 4 and 17, that is, the server 50 which performs a process of generating a file storing the image data, the audio data, and the audio control information and transmitting the file to the information processing device (the user device) 70.

A central processing unit (CPU) 301 functions as a data processing unit that performs various kinds of processes in accordance with a program stored in a read only memory (ROM) 302 or a storage unit 308. For example, the CPU 301 performs the processes according to the sequence described in the above-described embodiment. The random access memory (RAM) 303 stores programs executed by the CPU 301, data, and the like. The CPU 301, the ROM 302, and the RAM 303 are connected to one another via a bus 304.

The CPU 301 is connected to an input/output interface 305 via the bus 304, and an input unit 306 configured with various kinds of switches, a keyboard, a mouse, a microphone, or the like, a display unit 307 configured with a display, a speaker, or the like, audio output units 321-1 to 321-n are connected to the input/output interface 305. The CPU 301 executes various kinds of processes in accordance with a command input from the input unit 306, and outputs processing results to, for example, the display unit 307 and the audio output units 321-1 to 321-n.

A storage unit 308 connected to the input/output interface 305 is configured with, for example, a hard disk or the like, and stores programs executed by the CPU 301 and various data. A communication unit 309 functions as a transceiving unit for data communication performed via a network such as the Internet or a local area network and a transceiving unit for broadcast waves and performs communication with an external device.

A drive 310 connected to the input/output interface 305 drives a removable medium 311 such as a magnetic disk, an optical disk, a magneto-optical disk, a semiconductor memory such as a memory card, and executes recording or reading of data.

Further, encoding or decoding of data can be performed as a processing of the CPU 301 serving as the data processing unit, but a codec which is dedicated hardware for executing an encoding process or a decoding process may be provided.

7. Conclusion of Configuration of Present Disclosure

The embodiment of the present disclosure has been described above in detail with reference to the specific example. However, it would be understood that those skilled in the art is able to make a modification or a substitution of the embodiment without departing from the gist of the present disclosure. In other words, the embodiment of the present disclosure discloses the present invention in an exemplary form and should not be interpreted restrictively. In order to judge the gist of the present disclosure, claims set forth below should be taken into consideration.

Further, the technology disclosed in this specification may have the following configurations.

(1) An information processing device, including:
a display unit that is able to selectively display images in different directions; and
a data processing unit that controls an audio to be output to the display unit together with an image display,
in which the data processing unit executes,
in units of individual controllable audio elements,
image following type audio control of moving an audio source direction in accordance with movement of the display image of the display unit and
image non-following type audio control of not moving the audio source direction in accordance with the movement of the display image of the display unit.

(2) The information processing device according to (1),
in which the data processing unit acquires audio control information related to output audio data and executes any one of the image following type audio control and the image non-following type audio control in units of individual controllable audio elements in accordance with the acquired audio control information.

(3) The information processing device according to (2),
in which the audio control information includes all-audio correspondence control information which is control information corresponding to all audios serving as an output target, and
the data processing unit executes collective control of all the audios serving as the output target in accordance with a setting value of the all-audio correspondence control information.

(4) The information processing device according to (3),
in which, in a case where the setting value of the all-audio correspondence control information is a setting value indicating the image following type audio control,
the data processing unit executes the image following type audio control of moving the audio source direction in accordance with the movement of the display image of the display unit for all the audios serving as the output target.

(5) The information processing device according to (3),
in which, in a case where the setting value of the all-audio correspondence control information is a setting value indicating the image non-following type audio control,
the data processing unit executes the image non-following type audio control of not moving the audio source direction in accordance with the movement of the display image of the display unit for all the audios serving as the output target.

(6) The information processing device according to any of (3) to (5),
in which the audio control information includes audio element correspondence control information which is control information corresponding to each audio element serving as an output target,
in a case where the setting value of the all-audio correspondence control information is a setting value indicating that an audio element of the image following type audio control target and an audio element of the image non-following type audio control are mixed, the data processing unit further acquires the audio element correspondence control information and controls each audio element serving as the output target in accordance with the setting value of the audio element correspondence control information.

(7) The information processing device according to (6), in which the data processing unit executes the image following type audio control of moving the audio source direction in accordance with the movement of the display image of the display unit for the audio element in which the setting value of the audio element correspondence control information is a setting value indicating the image following type audio control.

(8) The information processing device according to (6), in which the data processing unit executes the image non-following type audio control of not moving the audio source direction in accordance with the movement of the display image of the display unit for the audio element in which the setting value of the audio element correspondence control information is a setting value indicating the image non-following type audio control.

(9) The information processing device according to any of (2) to (8), in which the audio control information is stored in an MP4 file, and the data processing unit acquires the audio control information related to the output audio data from the MP4 file and executes any one of the image following type audio control and the image non-following type audio control in units of individual controllable audio elements in accordance with the acquired audio control information.

(10) The information processing device according to (9), in which the audio control information is stored in a trak box of the MP4 file, and the data processing unit acquires the audio control information related to the output audio data from the trak box of the MP4 file and executes any one of the image following type audio control and the image non-following type audio control in units of individual controllable audio elements in accordance with the acquired audio control information.

(11) The information processing device according to any of (2) to (8), in which the audio control information is stored in a media presentation description (MPD) file, and the data processing unit acquires the audio control information related to the output audio data from the MPD file and executes any one of the image following type audio control and the image non-following type audio control in units of individual controllable audio elements in accordance with the acquired audio control information.

(12) The information processing device according to (11), in which the audio control information is stored in an adaptation set recording region of the MPD file, and the data processing unit acquires the audio control information related to the output audio data from the adaptation set recording region of the MPD file and executes any one of the image following type audio control and the image non-following type audio control in units of individual controllable audio elements in accordance with the acquired audio control information.

(13) A data delivery server, including:

a data processing unit that generates a file storing image data including images in different directions which are selectively displayable, audio data to be output together with a display image which is selected from the image data and displayed, and audio control information indicating any one of image following type audio control and image non-following type audio control which is executed in units of individual controllable audio elements, the image following type audio control being executed such that an audio source direction is moved in accordance with movement of the display image, the image non-following type audio control being executed such that the audio source direction is not moved in accordance with the movement of the display image; and a communication unit that transmits the file generated by the data processing unit.

(14) An information recording medium storing image data including images in different directions which are selectively displayable, audio data to be output together with a display image which is selected from the image data and displayed, and audio control information indicating any one of image following type audio control and image non-following type audio control which is executed in units of individual controllable audio elements, the image following type audio control being executed such that an audio source direction is moved in accordance with movement of the display image, the image non-following type audio control being executed such that the audio source direction is not moved in accordance with the movement of the display image, in which a reproducing device that reproduces read data from the information recording medium executes any one of the image following type audio control and the image non-following type audio control in units of individual controllable audio elements in accordance with the audio control information.

(15) An information processing method of controlling output audio in an information processing device, the information processing device including a display unit that is able to selectively display images in different directions and a data processing unit that controls an audio to be output to the display unit together with an image display, the information processing method including:

executing, by the data processing unit, in units of individual controllable audio elements, image following type audio control of moving an audio source direction in accordance with movement of the display image of the display unit and image non-following type audio control of not moving the audio source direction in accordance with the movement of the display image of the display unit.

(16) A program causing an information processing device to control an output audio, the information processing device including a display unit that is able to selectively display images in different directions, and a data processing unit that controls an audio to be output to the display unit together with an image display, the program causing the data processing unit to execute:

in units of individual controllable audio elements, image following type audio control of moving an audio source direction in accordance with movement of the display image of the display unit and image non-following type audio control of not moving the audio source direction in accordance with the movement of the display image of the display unit.

Further, a series of processes described in this specification can be executed by hardware, software, or a combination of both. In a case where the processes are executed by software, it is possible to install a program having a process sequence recorded therein in a memory in a computer incorporated into dedicated hardware and execute the program, or it is possible to install the program in a generalpurpose computer capable of executing various kinds of processes and execute the program. For example, the program may be recorded in a recording medium in advance. Instead of installing the program from the recording medium to the computer, the program may be received via a network such as a local area network (LAN), the Internet, or the like and installed in a recording medium such as an internal hard disk.

Further, various kinds of processes described in this specification may be chronologically executed in accordance with the description or may be executed in parallel or individually depending on a processing capability of a device which executes the processes or as necessary. Further, in this specification, a system refers to a logical aggregate configuration of a plurality of devices and is not limited to a configuration in which devices of respective components are disclosed in a single housing.

INDUSTRIAL APPLICABILITY

As described above, according to the configuration of one embodiment of the present disclosure, a device and a method which are capable of performing image following type audio control in which an audio source direction follows movement of a display image of a display unit or image non-following type audio control in units of individual audio elements are implemented.

Specifically, images in different directions are selectively displayed on the display unit, and an output audio is controlled in accordance with an image display. The data processing unit executes image following type audio control of moving an audio source direction in accordance with movement of the display image of the display unit and image non-following type audio control of not moving the audio source direction in accordance with the movement of an image in units of individual controllable audio elements. The data processing unit acquires audio control information from an MP4 file or a media presentation description (MPD) file and executes either the image following type audio control or the image non-following type audio control in accordance with the acquired audio control information in units of individual controllable audio elements.

With this configuration, a device and a method which are capable of performing image following type audio control in which an audio source direction follows movement of a display image of a display unit or image non-following type audio control in units of individual audio elements are implemented.

REFERENCE SIGNS LIST

10 Image data
20 Mobile terminal
25 Speaker
30 Head mount display (HMD)
35 Speaker
50 Server
51 Broadcasting server
52 Data delivery server
60 Medium
70 Information processing device
71 TV
72 PC
73 Mobile terminal
74 Head mount display (HMD)
81 MP4 file
82 MPD file
301 CPU
302 ROM
303 RAM
304 Bus
305 Input/output interface
306 Input unit
307 Display unit
308 Storage unit
309 Communication unit
310 Drive
311 Removable medium
321 Audio output unit

The invention claimed is:

1. An information processing device, comprising:
a display unit configured to selectively output a display image from among a plurality of images in a plurality of different directions; and
a data processing unit configured to
acquire audio control information related to output audio data, and
control audio to be output to the display unit together with the display image in accordance with the acquired audio control information,
wherein the data processing unit executes, for one or more individual controllable audio elements related to the display image, at least one of
image following type audio control of moving an audio source direction in accordance with movement of the display image of the display unit between the plurality of images in the plurality of different directions, or
image non-following type audio control of fixing the audio source direction regardless of the movement of the display image of the display unit,
wherein the data processing unit determines whether to execute the image following type audio control or the image non-following type audio control in accordance with the acquired audio control information,
wherein the audio control information includes all-audio correspondence control information which is control information indicating an audio control form corresponding to the one or more individual controllable audio elements serving as an output target,
wherein the audio control form determines whether to execute the image following type audio control or the image non-following type audio control for each individual controllable audio element or to execute the image following type audio control or the image non-following type audio control collectively for all of the one or more individual controllable audio elements, and
wherein the display unit and the data processing unit are each implemented via at least one processor.

2. The information processing device according to claim 1,
wherein the data processing unit executes collective control of all the one or more individual controllable audio elements serving as the output target in accordance with a setting value of the all-audio correspondence control information.

3. The information processing device according to claim 2,
wherein, in a case where the setting value of the all-audio correspondence control information indicates the image following type audio control, the data processing unit executes the image following type audio control of moving the audio source direction in accordance with the movement of the display image of the display unit for all the one or more individual controllable audio elements serving as the output target.

4. The information processing device according to claim 2,
wherein, in a case where the setting value of the all-audio correspondence control information indicates the image non-following type audio control, the data processing unit executes the image non-following type audio control of fixing the audio source direction regardless of the movement of the display image of the display unit for all the one or more individual controllable audio elements serving as the output target.

5. The information processing device according to claim 2,
wherein the audio control information includes audio element correspondence control information which is control information corresponding to each individual controllable audio element serving as an output target,
wherein, in a case where the setting value of the all-audio correspondence control information indicates that an individual controllable audio element of the image following type audio control target and an individual controllable audio element of the image non-following type audio control are mixed, the data processing unit further acquires the audio element correspondence control information and controls each individual controllable audio element serving as the output target in accordance with a corresponding setting value of the audio element correspondence control information.

6. The information processing device according to claim 5,
wherein the data processing unit executes the image following type audio control of moving the audio source direction in accordance with the movement of the display image of the display unit for each individual controllable audio element in which the corresponding setting value of the audio element correspondence control information indicates the image following type audio control.

7. The information processing device according to claim 5,
wherein the data processing unit executes the image non-following type audio control of fixing the audio source direction regardless of the movement of the display image of the display unit for each individual controllable audio element in which the corresponding setting value of the audio element correspondence control information indicates the image non-following type audio control.

8. The information processing device according to claim 5,
wherein the data processing unit executes the image following type audio control of moving the audio source direction in accordance with the movement of the display image of the display unit for each individual controllable audio element corresponding to one or more objects included in the display image.

9. The information processing device according to claim 5,
wherein the data processing unit executes the image non-following type audio control of not moving the audio source direction in accordance with the movement of the display image of the display unit for each individual controllable audio element that does not correspond to any of the objects included in the display image.

10. The information processing device according to claim 1,
wherein the audio control information is stored in an MP4 file, and
wherein the data processing unit acquires the audio control information related to the output audio data from the MP4 file and executes at least one of the image following type audio control or the image non-following type audio control for each of the one or more individual controllable audio elements in accordance with the acquired audio control information.

11. The information processing device according to claim 10,
wherein the audio control information is stored in a trak box of the MP4 file, and
wherein the data processing unit acquires the audio control information related to the output audio data from the trak box of the MP4 file and executes at least one of the image following type audio control or the image non-following type audio control for each of the one or more individual controllable audio elements in accordance with the acquired audio control information.

12. The information processing device according to claim 1,
wherein the audio control information is stored in a media presentation description (MPD) file, and
the data processing unit acquires the audio control information related to the output audio data from the MPD file and executes at least one of the image following type audio control or the image non-following type audio control for each of the one or more individual controllable audio elements in accordance with the acquired audio control information.

13. The information processing device according to claim 12,
wherein the audio control information is stored in an adaptation set recording region of the MPD file, and
wherein the data processing unit acquires the audio control information related to the output audio data from the adaptation set recording region of the MPD file and executes at least one of the image following type audio control or the image non-following type audio control for each of the one or more individual controllable audio elements in accordance with the acquired audio control information.

14. A data delivery server, comprising:
a data processing unit that generates a file storing
image data including a plurality of images in a plurality of different directions which are selectively displayable,
audio data to be output together with a display image which is selected from the image data and displayed, and
audio control information indicating at least one of image following type audio control or image non-following type audio control which is executed for one or more individual controllable audio elements related to the display image, the image following type audio control being executed such that an audio source direction is moved in accordance with movement of the display image between the plurality of images in the plurality of different directions, and the image non-following type audio control being executed such that the audio source direction is fixed regardless of the movement of the display image; and a communication unit that transmits the file generated by the data processing unit, wherein the audio control information includes all-audio correspondence control information which is control information indicating an audio control form corresponding to the one or more individual controllable audio elements serving as an output target, wherein the audio control form determines whether to execute the image following type audio control or the image non-following type audio control for each individual controllable audio element or to execute the image following type audio control or the image non-following type audio control collectively for all of the one or more individual controllable audio elements, and wherein the data processing unit and the communication unit are each implemented via at least one processor.

15. A non-transitory computer-readable storage medium having embodied thereon a program, which when executed by a computer, causes the computer to execute a method, the method comprising:

storing image data including a plurality of images in a plurality of different directions which are selectively displayable;

storing audio data to be output together with a display image which is selected from the image data and displayed; and storing audio control information indicating at least one of image following type audio control or image non-following type audio control which is executed for one or more individual controllable audio elements related to the display image, the image following type audio control being executed such that an audio source direction is moved in accordance with movement of the display image between the plurality of images in the plurality of different directions, and the image non-following type audio control being executed such that the audio source direction is fixed regardless of the movement of the display image, wherein a reproducing device that reproduces read data from the non-transitory computer-readable storage medium executes at least one of the image following type audio control or the image non-following type audio control in the units of individual controllable audio elements in accordance with the audio control information, wherein the audio control information includes all-audio correspondence control information which is control information indicating an audio control form corresponding to the one or more individual controllable audio elements serving as an output target, and wherein the audio control form determines whether to execute the image following type audio control or the image non-following type audio control for each individual controllable audio element or to execute the image following type audio control or the image non-following type audio control collectively for all of the one or more individual controllable audio elements.

16. An information processing method of controlling output audio in an information processing device, the information processing device comprising
    a display unit configured to selectively output a display image from among a plurality of images in a plurality of different directions, and
    a data processing unit configured to control audio to be output to the display unit together with the display image, the information processing method comprising:

executing, by the data processing unit, for one or more individual controllable audio elements related to the display image in accordance with acquired audio control information, image following type audio control of moving an audio source direction in accordance with movement of the display image of the display unit between the plurality of images in the plurality of different directions, or image non-following type audio control of fixing the audio source direction regardless of the movement of the display image of the display unit, wherein the audio control information includes all-audio correspondence control information which is control information indicating an audio control form corresponding to the one or more individual controllable audio elements serving as an output target, and wherein the audio control form determines whether to execute the image following type audio control or the image non-following type audio control for each individual controllable audio element or to execute the image following type audio control or the image non-following type audio control collectively for all of the one or more individual controllable audio elements.

17. A non-transitory computer-readable storage medium having embodied thereon a program, which when executed by an information processing device causes the information processing device to execute a method, the method comprising:

selectively outputting a display image from among a plurality of images in a plurality of different directions; and controlling audio to be output to the display unit together with the display image, wherein the program causes the information processing device to execute, for one or more individual controllable audio elements related to the display image in accordance with acquired audio control information, image following type audio control of moving an audio source direction in accordance with movement of the display image between the plurality of images in the plurality of different directions, or image non-following type audio control of fixing the audio source direction regardless of the movement of the display image, wherein the audio control information includes all-audio correspondence control information which is control information indicating an audio control form corresponding to the one or more individual controllable audio elements serving as an output target, and wherein the audio control form determines whether to execute the image following type audio control or the image non-following type audio control for each individual controllable audio element or to execute the image following type audio control or the image non-following type audio control collectively for all of the one or more individual controllable audio elements.

* * * * *